(12) United States Patent
Mcintyre et al.

(10) Patent No.: US 10,509,844 B1
(45) Date of Patent: Dec. 17, 2019

(54) NETWORK GRAPH PARSER

(71) Applicant: Palantir Technologies Inc., Palo Alto, CA (US)

(72) Inventors: Thomas Mcintyre, London (GB); Carl Rosen, London (GB); Eliot Ball, London (GB); John Chakerian, Los Altos Hills, CA (US); Joseph Carter, Arlington, VA (US); Kevin Today, Houston, TX (US); Marvel Church, New York, NY (US); Michal Stojek, London (GB); Ranec Highet, Broxbourne (GB); Ronald Highet, London (GB); Maciej Laska, London (GB)

(73) Assignee: Palantir Technologies Inc., Palo Alto, CA (US)

( * ) Notice: Subject to any disclaimer, the term of this patent is extended or adjusted under 35 U.S.C. 154(b) by 90 days.

(21) Appl. No.: 15/642,820

(22) Filed: Jul. 6, 2017

Related U.S. Application Data

(60) Provisional application No. 62/448,081, filed on Jan. 19, 2017.

(51) Int. Cl.
| | |
|---|---|
| *G06F 16/957* | (2019.01) |
| *G06F 17/27* | (2006.01) |
| *G06T 11/20* | (2006.01) |
| *G06F 3/0484* | (2013.01) |

(52) U.S. Cl.
CPC ........ *G06F 16/9577* (2019.01); *G06F 17/272* (2013.01); *G06F 3/04842* (2013.01); *G06T 11/206* (2013.01)

(58) Field of Classification Search
None
See application file for complete search history.

(56) References Cited

U.S. PATENT DOCUMENTS

| | | |
|---|---|---|
| 5,418,950 A | 5/1995 | Li et al. |
| 5,428,737 A | 6/1995 | Li et al. |
| 5,428,776 A | 6/1995 | Rothfield |
| 5,515,488 A | 5/1996 | Hoppe et al. |

(Continued)

FOREIGN PATENT DOCUMENTS

| | | |
|---|---|---|
| CN | 102546446 A | 7/2012 |
| CN | 103167093 A | 6/2013 |

(Continued)

OTHER PUBLICATIONS

"A Quick Guide to UniProtKB Swiss-Prot & TrEMBL", UniProt Consortium, Ongoing and future developments at the Universal Protein Resource, (Sep. 2011), 1-2.

(Continued)

*Primary Examiner* — Toan H Vu
(74) *Attorney, Agent, or Firm* — Schwegman Lundberg & Woessner, P.A.

(57) ABSTRACT

An approach for processing node data from code repository websites to generate patterns is disclosed. Node data can be parsed from a projects webpage or received from a code repository server hosting the repository website. Visualizations can be generated in a browser from the node data. The visualizations can be displayed within the browser and further be used to receive filter instructions. Refined node data can then be exported for further analysis.

20 Claims, 19 Drawing Sheets

(56) References Cited

U.S. PATENT DOCUMENTS

| | | |
|---|---|---|
| 5,542,089 A | 7/1996 | Lindsay et al. |
| 5,608,899 A | 3/1997 | Li et al. |
| 5,613,105 A | 3/1997 | Zbikowski et al. |
| 5,701,456 A | 12/1997 | Jacopi et al. |
| 5,724,575 A | 3/1998 | Hoover et al. |
| 5,794,228 A | 8/1998 | French et al. |
| 5,794,229 A | 8/1998 | French et al. |
| 5,857,329 A | 1/1999 | Bigham |
| 5,911,138 A | 6/1999 | Li et al. |
| 5,918,225 A | 6/1999 | White et al. |
| 6,208,985 B1 | 3/2001 | Krehel |
| 6,236,994 B1 | 5/2001 | Swartz et al. |
| 6,289,334 B1 | 9/2001 | Reiner et al. |
| 6,311,181 B1 | 10/2001 | Lee et al. |
| 6,321,274 B1 | 11/2001 | Shakib et al. |
| 6,430,305 B1 | 8/2002 | Decker |
| 6,643,613 B2 | 11/2003 | McGee et al. |
| 6,745,382 B1 | 6/2004 | Zothner |
| 6,820,135 B1 | 11/2004 | Dingman et al. |
| 6,851,108 B1 | 2/2005 | Syme et al. |
| 6,857,120 B1 | 2/2005 | Arnold et al. |
| 6,877,137 B1 | 4/2005 | Rivette et al. |
| 6,976,024 B1 | 12/2005 | Chavez, Jr. et al. |
| 6,978,419 B1 | 12/2005 | Kantrowitz |
| 6,980,984 B1 | 12/2005 | Huffman et al. |
| 7,028,223 B1 | 4/2006 | Kolawa et al. |
| 7,085,890 B2 | 8/2006 | Kashyap |
| 7,155,728 B1 | 12/2006 | Prabhu et al. |
| 7,168,039 B2 | 1/2007 | Bertram |
| 7,216,133 B2 | 5/2007 | Wu et al. |
| 7,406,592 B1 | 7/2008 | Polyudov |
| 7,461,077 B1 | 12/2008 | Greenwood et al. |
| 7,519,589 B2 | 4/2009 | Charnock et al. |
| 7,546,353 B2 | 6/2009 | Hesselink et al. |
| 7,610,290 B2 | 10/2009 | Kruy et al. |
| 7,617,232 B2 | 11/2009 | Gabbert et al. |
| 7,627,489 B2 | 12/2009 | Schaeffer et al. |
| 7,756,843 B1 | 7/2010 | Palmer |
| 7,783,679 B2 | 8/2010 | Bley |
| 7,853,573 B2 | 12/2010 | Warner et al. |
| 7,877,421 B2 | 1/2011 | Berger et al. |
| 7,899,796 B1 | 3/2011 | Borthwick et al. |
| 7,908,521 B2 | 3/2011 | Sridharan et al. |
| 7,917,376 B2 | 3/2011 | Bellin et al. |
| 7,941,321 B2 | 5/2011 | Greenstein et al. |
| 7,979,424 B2 | 7/2011 | Dettinger |
| 8,036,971 B2 | 10/2011 | Aymeloglu et al. |
| 8,037,046 B2 | 10/2011 | Udezue et al. |
| 8,046,283 B2 | 10/2011 | Burns et al. |
| 8,054,756 B2 | 11/2011 | Chand et al. |
| 8,073,857 B2 | 12/2011 | Sreekanth |
| 8,103,962 B2 | 1/2012 | Embley et al. |
| 8,214,490 B1 | 7/2012 | Vos et al. |
| 8,229,902 B2 | 7/2012 | Vishniac et al. |
| 8,290,838 B1 | 10/2012 | Thakur et al. |
| 8,302,855 B2 | 11/2012 | Ma et al. |
| 8,386,377 B1 | 2/2013 | Xiong et al. |
| 8,417,715 B1 | 4/2013 | Bruckhaus |
| 8,429,194 B2 | 4/2013 | Aymeloglu et al. |
| 8,433,702 B1 | 4/2013 | Carrino et al. |
| 8,473,454 B2 | 6/2013 | Evanitsky et al. |
| 8,484,115 B2 | 7/2013 | Aymeloglu et al. |
| 8,489,641 B1 | 7/2013 | Seefeld et al. |
| 8,499,287 B2 | 7/2013 | Shafi et al. |
| 8,560,494 B1 | 10/2013 | Downing et al. |
| 8,577,911 B1 | 11/2013 | Stepinski et al. |
| 8,589,273 B2 | 11/2013 | Creeden et al. |
| 8,639,552 B1 | 1/2014 | Chen et al. |
| 8,688,573 B1 | 4/2014 | Rukonic et al. |
| 8,744,890 B1 | 6/2014 | Bernier et al. |
| 8,799,799 B1 | 8/2014 | Cervelli et al. |
| 8,799,867 B1 | 8/2014 | Peri-Glass et al. |
| 8,806,355 B2 | 8/2014 | Twiss et al. |
| 8,812,960 B1 | 8/2014 | Sun et al. |
| 8,909,597 B2 | 12/2014 | Aymeloglu et al. |
| 8,924,388 B2 | 12/2014 | Elliot et al. |
| 8,924,389 B2 | 12/2014 | Elliot et al. |
| 8,924,429 B1 | 12/2014 | Fisher et al. |
| 8,935,201 B1 | 1/2015 | Fisher et al. |
| 8,938,686 B1 | 1/2015 | Erenrich et al. |
| 8,949,164 B1 | 2/2015 | Mohler |
| 8,984,121 B1* | 3/2015 | Labat .................. G06F 8/70 |
| | | 707/769 |
| 9,031,981 B1 | 5/2015 | Potter et al. |
| 9,069,842 B2 | 6/2015 | Melby |
| 9,100,428 B1 | 8/2015 | Visbal |
| 9,105,000 B1 | 8/2015 | White et al. |
| 9,111,281 B2 | 8/2015 | Stibel et al. |
| 9,129,219 B1 | 9/2015 | Robertson et al. |
| 9,256,664 B2 | 2/2016 | Chakerian et al. |
| 9,280,618 B1 | 3/2016 | Bruce et al. |
| 9,286,373 B2 | 3/2016 | Elliot et al. |
| 9,292,388 B2 | 3/2016 | Fisher et al. |
| 9,330,120 B2 | 5/2016 | Downing et al. |
| 9,335,911 B1 | 5/2016 | Elliot et al. |
| 9,348,677 B2 | 5/2016 | Marinelli |
| 9,378,526 B2 | 6/2016 | Sampson |
| 9,836,183 B1* | 12/2017 | Love ................... G06T 11/206 |
| 9,881,226 B1* | 1/2018 | Rybakov ............... G06K 9/46 |
| 2002/0065708 A1 | 5/2002 | Senay et al. |
| 2002/0095360 A1 | 7/2002 | Joao |
| 2002/0095658 A1 | 7/2002 | Shulman et al. |
| 2002/0103705 A1 | 8/2002 | Brady |
| 2002/0147805 A1 | 10/2002 | Leshem et al. |
| 2002/0184111 A1 | 12/2002 | Swanson |
| 2003/0004770 A1 | 1/2003 | Miller et al. |
| 2003/0023620 A1 | 1/2003 | Trotta |
| 2003/0105833 A1 | 6/2003 | Daniels et al. |
| 2003/0126102 A1 | 7/2003 | Borthwick |
| 2003/0212670 A1 | 11/2003 | Yalamanchi et al. |
| 2004/0034570 A1 | 2/2004 | Davis |
| 2004/0088177 A1 | 5/2004 | Travis et al. |
| 2004/0098731 A1 | 5/2004 | Demsey et al. |
| 2004/0103088 A1 | 5/2004 | Cragun et al. |
| 2004/0111480 A1 | 6/2004 | Yue |
| 2004/0126840 A1 | 7/2004 | Cheng et al. |
| 2004/0139212 A1 | 7/2004 | Mukherjee |
| 2004/0153418 A1 | 8/2004 | Hanweck |
| 2004/0153837 A1 | 8/2004 | Preston et al. |
| 2004/0193608 A1 | 9/2004 | Gollapudi et al. |
| 2004/0236688 A1 | 11/2004 | Bozeman |
| 2004/0254658 A1 | 12/2004 | Sherriff et al. |
| 2004/0260702 A1 | 12/2004 | Cragun et al. |
| 2005/0004911 A1 | 1/2005 | Goldberg et al. |
| 2005/0010472 A1 | 1/2005 | Quatse et al. |
| 2005/0021397 A1 | 1/2005 | Cui et al. |
| 2005/0086207 A1 | 4/2005 | Heuer et al. |
| 2005/0120080 A1 | 6/2005 | Weinreb et al. |
| 2005/0154628 A1 | 7/2005 | Eckart et al. |
| 2005/0154769 A1 | 7/2005 | Eckart et al. |
| 2005/0183005 A1 | 8/2005 | Denoue et al. |
| 2005/0226473 A1 | 10/2005 | Ramesh |
| 2005/0278286 A1 | 12/2005 | Djugash et al. |
| 2006/0004740 A1 | 1/2006 | Dettinger et al. |
| 2006/0026120 A1 | 2/2006 | Carolan et al. |
| 2006/0026170 A1 | 2/2006 | Kreitler et al. |
| 2006/0070046 A1 | 3/2006 | Balakrishnan et al. |
| 2006/0074967 A1 | 4/2006 | Shaburov |
| 2006/0080283 A1 | 4/2006 | Shipman |
| 2006/0080616 A1 | 4/2006 | Vogel et al. |
| 2006/0116991 A1 | 6/2006 | Calderwood |
| 2006/0129992 A1 | 6/2006 | Oberholtzer et al. |
| 2006/0142949 A1 | 6/2006 | Helt |
| 2006/0143034 A1 | 6/2006 | Rothermel et al. |
| 2006/0143075 A1 | 6/2006 | Carr et al. |
| 2006/0143079 A1 | 6/2006 | Basak et al. |
| 2006/0209085 A1 | 9/2006 | Wong et al. |
| 2006/0271838 A1 | 11/2006 | Carro |
| 2006/0271884 A1 | 11/2006 | Hurst |
| 2006/0288046 A1 | 12/2006 | Gupta |
| 2007/0000999 A1 | 1/2007 | Kubo et al. |
| 2007/0005582 A1 | 1/2007 | Navratil et al. |
| 2007/0011304 A1 | 1/2007 | Error |
| 2007/0027851 A1 | 2/2007 | Kruy et al. |

(56) References Cited

U.S. PATENT DOCUMENTS

| | | |
|---|---|---|
| 2007/0038646 A1 | 2/2007 | Thota |
| 2007/0094248 A1 | 4/2007 | McVeigh et al. |
| 2007/0113164 A1 | 5/2007 | Hansen et al. |
| 2007/0150801 A1 | 6/2007 | Chidlovskii et al. |
| 2007/0150805 A1 | 6/2007 | Misovski |
| 2007/0156673 A1 | 7/2007 | Maga et al. |
| 2007/0162454 A1 | 7/2007 | D' Albora et al. |
| 2007/0168336 A1 | 7/2007 | Ransil et al. |
| 2007/0178501 A1 | 8/2007 | Rabinowitz et al. |
| 2007/0185867 A1 | 8/2007 | Maga et al. |
| 2007/0192122 A1 | 8/2007 | Routson et al. |
| 2007/0192281 A1 | 8/2007 | Cradick et al. |
| 2007/0260582 A1 | 11/2007 | Liang |
| 2007/0284433 A1 | 12/2007 | Domenica et al. |
| 2008/0065655 A1 | 3/2008 | Chakravarthy et al. |
| 2008/0069081 A1 | 3/2008 | Chand et al. |
| 2008/0077642 A1 | 3/2008 | Carbone |
| 2008/0103996 A1 | 5/2008 | Forman et al. |
| 2008/0126344 A1 | 5/2008 | Hoffman et al. |
| 2008/0126951 A1 | 5/2008 | Sood et al. |
| 2008/0155440 A1 | 6/2008 | Trevor et al. |
| 2008/0196016 A1 | 8/2008 | Todd |
| 2008/0201313 A1 | 8/2008 | Dettinger et al. |
| 2008/0208735 A1 | 8/2008 | Balet et al. |
| 2008/0215543 A1 | 9/2008 | Huang et al. |
| 2008/0222295 A1 | 9/2008 | Robinson et al. |
| 2008/0243711 A1 | 10/2008 | Aymeloglu et al. |
| 2008/0255973 A1 | 10/2008 | El Wade et al. |
| 2008/0267386 A1 | 10/2008 | Cooper |
| 2008/0270328 A1 | 10/2008 | Lafferty et al. |
| 2008/0294663 A1 | 11/2008 | Heinley et al. |
| 2008/0313132 A1 | 12/2008 | Hao et al. |
| 2009/0006150 A1 | 1/2009 | Prigge et al. |
| 2009/0007056 A1 | 1/2009 | Prigge et al. |
| 2009/0043762 A1 | 2/2009 | Shiverick et al. |
| 2009/0055487 A1 | 2/2009 | Moraes et al. |
| 2009/0076845 A1 | 3/2009 | Bellin et al. |
| 2009/0083275 A1 | 3/2009 | Jacob et al. |
| 2009/0094166 A1 | 4/2009 | Aymeloglu et al. |
| 2009/0094217 A1 | 4/2009 | Dettinger et al. |
| 2009/0094270 A1 | 4/2009 | Alirez et al. |
| 2009/0106178 A1 | 4/2009 | Chu |
| 2009/0112745 A1 | 4/2009 | Stefanescu |
| 2009/0125359 A1 | 5/2009 | Knapic et al. |
| 2009/0125459 A1 | 5/2009 | Norton et al. |
| 2009/0132953 A1 | 5/2009 | Reed, Jr. et al. |
| 2009/0144747 A1 | 6/2009 | Baker |
| 2009/0157732 A1 | 6/2009 | Hao et al. |
| 2009/0161147 A1 | 6/2009 | Klave |
| 2009/0172674 A1 | 7/2009 | Bobak et al. |
| 2009/0187546 A1 | 7/2009 | Whyte |
| 2009/0187548 A1 | 7/2009 | Ji et al. |
| 2009/0187556 A1 | 7/2009 | Ross et al. |
| 2009/0193012 A1 | 7/2009 | Williams |
| 2009/0199047 A1 | 8/2009 | Vaitheeswaran et al. |
| 2009/0248721 A1 | 10/2009 | Burton et al. |
| 2009/0249244 A1 | 10/2009 | Robinson et al. |
| 2009/0254842 A1 | 10/2009 | Leacock et al. |
| 2009/0259636 A1 | 10/2009 | Labrou et al. |
| 2009/0271343 A1 | 10/2009 | Vaiciulis et al. |
| 2009/0282068 A1 | 11/2009 | Shockro et al. |
| 2009/0299830 A1 | 12/2009 | West et al. |
| 2009/0307049 A1 | 12/2009 | Elliott, Jr. et al. |
| 2009/0313463 A1 | 12/2009 | Pang et al. |
| 2009/0319418 A1 | 12/2009 | Herz |
| 2009/0319515 A1 | 12/2009 | Minton et al. |
| 2009/0319891 A1 | 12/2009 | MacKinlay et al. |
| 2010/0011282 A1 | 1/2010 | Dollard et al. |
| 2010/0030722 A1 | 2/2010 | Goodson et al. |
| 2010/0031141 A1 | 2/2010 | Summers et al. |
| 2010/0042922 A1 | 2/2010 | Bradateanu et al. |
| 2010/0057622 A1 | 3/2010 | Faith |
| 2010/0070464 A1 | 3/2010 | Aymeloglu et al. |
| 2010/0070842 A1 | 3/2010 | Aymeloglu et al. |
| 2010/0073315 A1 | 3/2010 | Lee et al. |
| 2010/0082671 A1 | 4/2010 | Li et al. |
| 2010/0098318 A1 | 4/2010 | Anderson |
| 2010/0106752 A1 | 4/2010 | Eckardt, III et al. |
| 2010/0114887 A1 | 5/2010 | Conway et al. |
| 2010/0131502 A1 | 5/2010 | Fordham |
| 2010/0145902 A1 | 6/2010 | Boyan et al. |
| 2010/0161646 A1 | 6/2010 | Ceballos et al. |
| 2010/0161735 A1 | 6/2010 | Sharma |
| 2010/0169376 A1 | 7/2010 | Chu |
| 2010/0169405 A1 | 7/2010 | Zhang |
| 2010/0191563 A1 | 7/2010 | Schlaifer et al. |
| 2010/0199167 A1 | 8/2010 | Uematsu et al. |
| 2010/0211535 A1 | 8/2010 | Rosenberger |
| 2010/0235915 A1 | 9/2010 | Memon et al. |
| 2010/0262688 A1 | 10/2010 | Hussain et al. |
| 2010/0293174 A1 | 11/2010 | Bennett |
| 2010/0312837 A1 | 12/2010 | Bodapati et al. |
| 2010/0313119 A1 | 12/2010 | Baldwin et al. |
| 2011/0035396 A1 | 2/2011 | Merz et al. |
| 2011/0040776 A1 | 2/2011 | Najm et al. |
| 2011/0041084 A1 | 2/2011 | Karam |
| 2011/0061013 A1 | 3/2011 | Bilicki et al. |
| 2011/0066497 A1 | 3/2011 | Gopinath et al. |
| 2011/0074811 A1 | 3/2011 | Hanson et al. |
| 2011/0078173 A1 | 3/2011 | Seligmann et al. |
| 2011/0093327 A1 | 4/2011 | Fordyce, III et al. |
| 2011/0093490 A1 | 4/2011 | Schindlauer et al. |
| 2011/0099133 A1 | 4/2011 | Chang et al. |
| 2011/0131547 A1 | 6/2011 | Elaasar |
| 2011/0145401 A1 | 6/2011 | Westlake |
| 2011/0153384 A1 | 6/2011 | Horne et al. |
| 2011/0173093 A1 | 7/2011 | Psota et al. |
| 2011/0208565 A1 | 8/2011 | Ross et al. |
| 2011/0208724 A1 | 8/2011 | Jones et al. |
| 2011/0208822 A1 | 8/2011 | Rathod |
| 2011/0213655 A1 | 9/2011 | Henkin et al. |
| 2011/0218955 A1 | 9/2011 | Tang et al. |
| 2011/0252282 A1 | 10/2011 | Meek et al. |
| 2011/0258216 A1 | 10/2011 | Supakkul |
| 2011/0270604 A1 | 11/2011 | Qi et al. |
| 2011/0270834 A1 | 11/2011 | Sokolan et al. |
| 2011/0270871 A1 | 11/2011 | He et al. |
| 2011/0289397 A1 | 11/2011 | Eastmond et al. |
| 2011/0295649 A1 | 12/2011 | Fine et al. |
| 2011/0314007 A1 | 12/2011 | Dassa et al. |
| 2011/0314024 A1 | 12/2011 | Chang et al. |
| 2011/0321008 A1 | 12/2011 | Jhoney et al. |
| 2012/0004904 A1 | 1/2012 | Shin et al. |
| 2012/0011238 A1 | 1/2012 | Rathod |
| 2012/0011245 A1 | 1/2012 | Gillette et al. |
| 2012/0022945 A1 | 1/2012 | Falkenborg et al. |
| 2012/0054284 A1 | 3/2012 | Rakshit |
| 2012/0059853 A1 | 3/2012 | Jagota |
| 2012/0066166 A1 | 3/2012 | Curbera et al. |
| 2012/0078595 A1 | 3/2012 | Balandin et al. |
| 2012/0079363 A1 | 3/2012 | Folting et al. |
| 2012/0084117 A1 | 4/2012 | Tavares et al. |
| 2012/0084287 A1 | 4/2012 | Lakshminarayan et al. |
| 2012/0089606 A1 | 4/2012 | Eshwar et al. |
| 2012/0102022 A1 | 4/2012 | Miranker et al. |
| 2012/0131512 A1 | 5/2012 | Takeuchi et al. |
| 2012/0144335 A1 | 6/2012 | Abeln et al. |
| 2012/0158527 A1 | 6/2012 | Cannelongo |
| 2012/0159362 A1 | 6/2012 | Brown et al. |
| 2012/0159449 A1 | 6/2012 | Arnold et al. |
| 2012/0173381 A1 | 7/2012 | Smith |
| 2012/0174057 A1 | 7/2012 | Narendra et al. |
| 2012/0188252 A1 | 7/2012 | Law |
| 2012/0215784 A1 | 8/2012 | King et al. |
| 2012/0221553 A1 | 8/2012 | Wittmer et al. |
| 2012/0226523 A1 | 9/2012 | Weiss et al. |
| 2012/0245976 A1 | 9/2012 | Kumar et al. |
| 2012/0284719 A1 | 11/2012 | Phan et al. |
| 2012/0323888 A1 | 12/2012 | Osann, Jr. |
| 2013/0016106 A1 | 1/2013 | Yip et al. |
| 2013/0024268 A1 | 1/2013 | Manickavelu |
| 2013/0024731 A1 | 1/2013 | Shochat et al. |
| 2013/0054306 A1 | 2/2013 | Bhalla et al. |
| 2013/0054551 A1 | 2/2013 | Lange |

(56) References Cited

U.S. PATENT DOCUMENTS

| | | |
|---|---|---|
| 2013/0055145 A1 | 2/2013 | Antony et al. |
| 2013/0057551 A1 | 3/2013 | Ebert et al. |
| 2013/0086482 A1 | 4/2013 | Parsons |
| 2013/0096968 A1 | 4/2013 | Van Pelt et al. |
| 2013/0096988 A1 | 4/2013 | Grossman et al. |
| 2013/0110746 A1 | 5/2013 | Ahn |
| 2013/0151453 A1 | 6/2013 | Bhanot et al. |
| 2013/0166348 A1 | 6/2013 | Scotto |
| 2013/0166480 A1 | 6/2013 | Popescu et al. |
| 2013/0185245 A1 | 7/2013 | Anderson et al. |
| 2013/0185307 A1 | 7/2013 | El-yaniv et al. |
| 2013/0198624 A1 | 8/2013 | Aymeloglu et al. |
| 2013/0212479 A1* | 8/2013 | Willis ............... G06Q 10/10 715/736 |
| 2013/0218879 A1 | 8/2013 | Park et al. |
| 2013/0225212 A1 | 8/2013 | Khan |
| 2013/0226318 A1 | 8/2013 | Procyk et al. |
| 2013/0226944 A1 | 8/2013 | Baid et al. |
| 2013/0232220 A1 | 9/2013 | Sampson |
| 2013/0238616 A1 | 9/2013 | Rose et al. |
| 2013/0246170 A1 | 9/2013 | Gross et al. |
| 2013/0246537 A1 | 9/2013 | Gaddala |
| 2013/0246597 A1 | 9/2013 | Iizawa et al. |
| 2013/0263019 A1 | 10/2013 | Castellanos et al. |
| 2013/0268520 A1 | 10/2013 | Fisher et al. |
| 2013/0282696 A1 | 10/2013 | John et al. |
| 2013/0290825 A1 | 10/2013 | Arndt et al. |
| 2013/0297619 A1 | 11/2013 | Chandrasekaran et al. |
| 2013/0304770 A1 | 11/2013 | Boero et al. |
| 2013/0318604 A1 | 11/2013 | Coates et al. |
| 2014/0012796 A1 | 1/2014 | Petersen et al. |
| 2014/0012886 A1 | 1/2014 | Downing et al. |
| 2014/0040371 A1 | 2/2014 | Gurevich et al. |
| 2014/0053091 A1 | 2/2014 | Hou et al. |
| 2014/0058914 A1 | 2/2014 | Song et al. |
| 2014/0068487 A1 | 3/2014 | Steiger et al. |
| 2014/0074888 A1 | 3/2014 | Potter et al. |
| 2014/0095509 A1 | 4/2014 | Patton |
| 2014/0108074 A1 | 4/2014 | Miller et al. |
| 2014/0108380 A1 | 4/2014 | Gotz et al. |
| 2014/0108985 A1 | 4/2014 | Scott et al. |
| 2014/0115589 A1 | 4/2014 | Marinelli, III et al. |
| 2014/0115610 A1 | 4/2014 | Marinelli, III et al. |
| 2014/0123279 A1 | 5/2014 | Bishop et al. |
| 2014/0136285 A1 | 5/2014 | Carvalho |
| 2014/0143009 A1 | 5/2014 | Brice et al. |
| 2014/0156527 A1 | 6/2014 | Grigg et al. |
| 2014/0157172 A1 | 6/2014 | Peery et al. |
| 2014/0164502 A1 | 6/2014 | Khodorenko et al. |
| 2014/0189536 A1 | 7/2014 | Lange et al. |
| 2014/0189870 A1 | 7/2014 | Singla et al. |
| 2014/0195515 A1 | 7/2014 | Baker et al. |
| 2014/0214579 A1 | 7/2014 | Shen et al. |
| 2014/0222521 A1 | 8/2014 | Chait |
| 2014/0222793 A1 | 8/2014 | Sadkin et al. |
| 2014/0229554 A1 | 8/2014 | Grunin et al. |
| 2014/0244388 A1 | 8/2014 | Manouchehri et al. |
| 2014/0280056 A1 | 9/2014 | Kelly |
| 2014/0282160 A1 | 9/2014 | Zarpas |
| 2014/0344230 A1 | 11/2014 | Krause et al. |
| 2014/0358829 A1 | 12/2014 | Hurwitz |
| 2014/0366132 A1 | 12/2014 | Stiansen et al. |
| 2015/0073929 A1 | 3/2015 | Psota et al. |
| 2015/0073954 A1 | 3/2015 | Braff |
| 2015/0095773 A1 | 4/2015 | Gonsalves et al. |
| 2015/0100897 A1 | 4/2015 | Sun et al. |
| 2015/0106170 A1 | 4/2015 | Bonica |
| 2015/0106379 A1 | 4/2015 | Elliot et al. |
| 2015/0112641 A1 | 4/2015 | Faraj |
| 2015/0120717 A1* | 4/2015 | Kim ............... G06F 16/335 707/727 |
| 2015/0134599 A1 | 5/2015 | Banerjee et al. |
| 2015/0135256 A1 | 5/2015 | Hoy et al. |
| 2015/0188872 A1 | 7/2015 | White |
| 2015/0242401 A1 | 8/2015 | Liu |
| 2015/0269030 A1 | 9/2015 | Fisher et al. |
| 2015/0338233 A1 | 11/2015 | Cervelli et al. |
| 2015/0379413 A1 | 12/2015 | Robertson et al. |
| 2016/0004764 A1 | 1/2016 | Chakerian et al. |
| 2016/0026923 A1 | 1/2016 | Erenrich et al. |
| 2016/0048556 A1* | 2/2016 | Kelly ............... G06F 16/9535 707/767 |
| 2016/0180557 A1 | 6/2016 | Yousaf et al. |
| 2017/0255686 A1* | 9/2017 | Ross ............... G06F 3/0485 |
| 2017/0330357 A1* | 11/2017 | Siegel ............... G06T 11/206 |
| 2018/0285685 A1* | 10/2018 | Singh ............... G06F 17/153 |

FOREIGN PATENT DOCUMENTS

| | | |
|---|---|---|
| CN | 102054015 B | 5/2014 |
| DE | 102014103482 A1 | 9/2014 |
| DE | 102014204827 A1 | 9/2014 |
| DE | 102014204830 A1 | 9/2014 |
| DE | 102014204834 A1 | 9/2014 |
| EP | 1647908 A2 | 4/2006 |
| EP | 2487610 A2 | 8/2012 |
| EP | 2634745 A1 | 9/2013 |
| EP | 2743839 A1 | 6/2014 |
| EP | 2778986 A1 | 9/2014 |
| EP | 2858018 A1 | 4/2015 |
| EP | 2869211 A2 | 5/2015 |
| EP | 2889814 A1 | 7/2015 |
| EP | 2892197 A1 | 7/2015 |
| EP | 2921975 A1 | 9/2015 |
| EP | 2963595 A1 | 1/2016 |
| EP | 2996053 A1 | 3/2016 |
| EP | 3035214 A1 | 6/2016 |
| EP | 3038002 | 6/2016 |
| EP | 3040885 | 7/2016 |
| GB | 2366498 A | 3/2002 |
| GB | 2508503 B | 1/2015 |
| GB | 2508293 B | 4/2015 |
| HK | 1194178 B | 9/2015 |
| NZ | 616212 A | 1/2015 |
| NZ | 622485 A | 3/2015 |
| NZ | 616299 A | 4/2015 |
| WO | WO-0034895 A1 | 6/2000 |
| WO | WO-2005116851 A2 | 12/2005 |
| WO | WO-2010030917 A2 | 3/2010 |
| WO | WO-2012061162 | 5/2012 |
| WO | WO-2013030595 A1 | 3/2013 |

OTHER PUBLICATIONS

"A Tour of Pinboard", [Online] Retrieved from the internet: <https://pinboard.in/tour/>, (May 15, 2014), 1-6.

"U.S. Appl. No. 13/411,291, Examiner Interview Summary dated Oct. 1, 2015", 3 pgs.

"U.S. Appl. No. 13/411,291, Non Final Office Action dated Jul. 15, 2015", 39 pgs.

"U.S. Appl. No. 13/411,291, Notice of Allowance dated Apr. 22, 2016", 27 pgs.

"U.S. Appl. No. 13/608,864, Final Office Action dated Jun. 8, 2015", 23 pgs.

"U.S. Appl. No. 13/608,864, First Action Interview dated Mar. 17, 2015", 4 pgs.

"U.S. Appl. No. 13/657,635, Final Office Action dated Oct. 7, 2015", 43 pgs.

"U.S. Appl. No. 13/657,635, Non Final Office Action dated Mar. 30, 2015", 20 pgs.

"U.S. Appl. No. 13/657,635, Notice of Allowance dated Jan. 29, 2016", 10 pgs.

"U.S. Appl. No. 13/657,656, Final Office Action dated May 6, 2015", 29 pgs.

"U.S. Appl. No. 13/657,656, Non Final Office Action dated Oct. 7, 2014", 16 pgs.

"U.S. Appl. No. 13/657,656, Notice of Allowance dated May 10, 2016", 27 pgs.

"U.S. Appl. No. 13/767,779, Notice of Allowance dated Mar. 17, 2015", 28 pgs.

(56) References Cited

OTHER PUBLICATIONS

"U.S. Appl. No. 13/827,627, Examiner Interview Summary dated Oct. 20, 2015", 3 pgs.
"U.S. Appl. No. 13/827,627, Final Office Action dated Aug. 26, 2015", 21 pgs.
"U.S. Appl. No. 13/827,627, Non Final Office Action dated Mar. 2, 2015", 22 pgs.
"U.S. Appl. No. 13/827,627, Non Final Office Action dated Dec. 22, 2015", 12 pgs.
"U.S. Appl. No. 13/827,627, Notice of Allowance dated Apr. 11, 2016", 5 pgs.
"U.S. Appl. No. 13/831,791, Final Office Action dated Aug. 6, 2015", 19 pgs.
"U.S. Appl. No. 13/831,791, Non Final Office Action dated Mar. 4, 2015", 20 pgs.
"U.S. Appl. No. 14/019,534, Examiner Interview Summary dated Sep. 4, 2015", 5 pgs.
"U.S. Appl. No. 14/019,534, First Action Interview Pre-Interview Communication dated Jul. 20, 2015", 4 pgs.
"U.S. Appl. No. 14/019,534, Notice of Allowance dated Feb. 4, 2016", 20 pgs.
"U.S. Appl. No. 14/025,653, First Action Interview Pre-Interview Communication dated Mar. 3, 2016", 9 pgs.
"U.S. Appl. No. 14/025,653, First Action Interview Pre-Interview Communication dated Oct. 6, 2015", 13 pgs.
"U.S. Appl. No. 14/134,558, Final Office Action dated May 16, 2016", 30 pgs.
"U.S. Appl. No. 14/134,558, Non Final Office Action dated Oct. 7, 2015", 9 pgs.
"U.S. Appl. No. 14/134,558, Office Action dated Aug. 26, 2016", 3 pgs.
"U.S. Appl. No. 14/254,757, Notice of Allowance dated Sep. 10, 2014", 30 pgs.
"U.S. Appl. No. 14/254,773, Notice of Allowance dated Aug. 20, 2014", 23 pgs.
"U.S. Appl. No. 14/304,741, Final Office Action dated Mar. 3, 2015", 24 pgs.
"U.S. Appl. No. 14/304,741, Notice of Allowance dated Apr. 7, 2015", 22 pgs.
"U.S. Appl. No. 14/304,741, Pre-Interview Communication dated Aug. 6, 2014", 13 pgs.
"U.S. Appl. No. 14/581,902, Notice of Allowance dated Nov. 13, 2015", 16 pgs.
"U.S. Appl. No. 14/877,229, Non Final Office Action dated Mar. 22, 2016", 46 pgs.
"U.S. Appl. No. 15/066,970, Notice of Allowance dated Jun. 29, 2016", 13 pgs.
"Australian Application Serial No. 2013237658, Office Action dated Feb. 2, 2015", 5 pgs.
"Australian Application Serial No. 2013237710, Office Action dated Jan. 16, 2015", 3 pgs.
"Australian Application Serial No. 2014201580, Office Action dated Feb. 27, 2015", 2 pgs.
"Canadian Application Serial No. 2,807,899, Office Action dated Jul. 20, 2015", 3 pgs.
"Canadian Application Serial No. 2,807,899, Office Action dated Oct. 24, 2014", 4 pgs.
"Canadian Application Serial No. 2,807,899, Office Action dated Jun. 14, 2016", 4 pgs.
"Canadian Application Serial No. 2,828,264, Office Action dated Apr. 11, 2016", 4 pgs.
"Canadian Application Serial No. 2,828,264, Office Action dated Apr. 28, 2015", 4 pgs.
"Canadian Application Serial No. 2,829,266, Office Action dated Apr. 1, 2016", 4 pgs.
"Canadian Application Serial No. 2,829,266, Office Action dated Apr. 28, 2015", 3 pgs.
"Chapter 2: IBM InfoSphere DataStage stages", IBM Corp; Modification 0 of IBM Information Server, Version 8, Release 1, 1st Edition, (2008), 35-137.

"Delicious", [Online]. Retrieved from the Internet: <URL: http://delicious.com/>, (accessed May 15, 2014), 1 pg.
"European Application Serial No. 13157474.1, Office Action dated Oct. 30, 2015", 5 pgs.
"European Application Serial No. 13157474.1, Summons to oral proceedings mailed Apr. 29, 2016", 6 pgs.
"European Application Serial No. 14159175.0, Office Action Feb. 4, 2016", 5 pgs.
"European Application Serial No. 14159175.0, Office Action dated Jul. 17, 2014", 10 pgs.
"European Application Serial No. 14159464.8, Non Final Office Action dated Feb. 18, 2016", 6 pgs.
"European Application Serial No. 14159629.6, Extended European Search Report dated Jul. 31, 2014", 7 pgs.
"European Application Serial No. 14159629.6, Office Action dated Sep. 22, 2014", 2 pgs.
"European Application Serial No. 15159520.4, Extended European Search Report dated Jul. 15, 2015", 9 pgs.
"Frequently Asked Questions about Office Binder 97", [Online]. Retrieved from the Internet: <URL: http://web.archive.org/web/20100210112922/http://support.microsoft.com/kb/843147>, (Accessed Dec. 18, 2006), 5 pgs.
"German Application Serial No. 102013221052.3, Office Action dated Mar. 24, 2015", w/English Translation, 17 pgs.
"German Application Serial No. 102013221057.4, Office Action dated Mar. 23, 2015", w/ English Translation, 17 pgs.
"Great Britain Application Serial No. 1404574.4, Office Action dated Dec. 18, 2014".
"Java Remote Method Invocation: 7—Remote Object Activation", [Online]. Retrieved from the Internet: <URL: https://docs.oracle.com/javase/7/docs/platform/rmi/spec/rmi-activation2.html, (accessed Dec. 31, 2010), 2 pgs.
"Machine Code", Wikipedia, [Online]. Retrieved from the Internet: <URL: http://en.wikipedia.org/wiki/Machine code>, (Accessed Aug. 11, 2014), 1-5.
"Netherlands Application Serial No. 2011613, Netherlands Search Report dated Aug. 13, 2015", W/ English Translation, 7 pgs.
"Netherlands Application Serial No. 2011627, Netherlands Search Report dated Aug. 14, 2015", W/ English Translation, 9 pgs.
"Netherlands Application Serial No. 2012437, Netherlands Search Report dated Sep. 18, 2015", W/ English Translation, 7 pgs.
"New Zealand Application Serial No. 616212, Notice of Allowance dated Jan. 23, 2015", 1 pg.
"New Zealand Application Serial No. 616299, Notice of Allowance dated Apr. 7, 2015", 1 pg.
"New Zealand Application Serial No. 616299, Office Action dated Jan. 26, 2015", 2 pgs.
"New Zealand Application Serial No. 622414, Office Action dated Mar. 24, 2014", 2 pgs.
"New Zealand Application Serial No. 622484, Office Action dated Apr. 2, 2014", 2 pgs.
"New Zealand Application Serial No. 622485, Notice of Allowance dated Nov. 24, 2014", 1 pg.
"New Zealand Application Serial No. 622485, Office Action dated Nov. 21, 2014", 1 pg.
"The FASTA Program Package", fasta-36.3.4, (Mar. 25, 2011), 1-29.
Bae, Jinuk, et al., "Partitioning Algorithms for the Computation of Average Iceberg Queries", DaWaK 2000, LNCS 1874, (2000), 276-286.
Ballesteros, Francisco, et al., "Batching: A Design Pattern for Efficient and Flexible Client/Server Interaction", Transaction on Pattern Language of Programming I, (c) Springer-Verlag Berlin Heidelberg 2009, (2009), 48-66.
Bogle, Phillip, et al., "Reducing Cross-Domain Call Overhead Using Batched Futures", SIGPLAN No. 29, 10, OOPSLA '94, (Oct. 1994), 341-354.
Bogle, Phillip, "Reducing Cross-Domain Call Overhead Using Batched Futures", Massachusetts Institute of Technology, (Submitted to the Dept. of Electrical Engineering and Computer Science in partial fulfillment of the requirement for the degree of Master of Science in Computer Science and Engineering), (1994), 1-96.

(56) References Cited

OTHER PUBLICATIONS

Bouajjani, Ahmed, et al., "Analysis of Recursively Parallel Programs", POPL'12, (Jan. 2012), 203-214.
Canese, Kathi, et al., "Chapter 2: PubMed: The Bibliographic Database", The NCBI Handbook, (Oct. 2002), 1-10.
Chazelle, Bernard, et al., "The Bloomier Filter: An Efficient Data Structure for Static Support Lookup Tables", SODA '04 Proceedings of the Fifteenth Annual ACMSIAM Symposium on Discrete Algorithms, (2004), 30-39.
Delcher, Arthur, et al., "Identifying Bacterial Genes and Endosymbiont DNA with Glimmer", BioInformatics, vol. 23, No. 6, (2007), 673-679.
Donjerkovic, Donko, et al., "Probabilistic Optimization of Top N Queries", Proceedings of the 25th VLDB Conference, (1999), 411-422.
Fang, Min, et al., "Computing Iceberg Queries Efficiently", Proceedings of the 24th VLDB Conference, (1998), 299-310.
Goldstein, Seth Copen, et al., "Stacks Lazy Threads: Implementing a Fast Parallel Call", Journal of Parallel and Distributed Computing, (Jan. 1996), 5-20.
Han, Jiawei, et al., "Efficient Computation of Iceberg Cubes with Complex Measures", ACM Sigmod, (May 21-24, 2001), 1-12.
Ivanova, Milena, et al., "An Architecture for Recycling Intermediates in a Column-store", Proceedings of the 35th Sigmod International Conference on Management of Data, SIGMOD '09, (Jun. 29, 2009), 309-320.
Jacques, Mathieu, "An Extensible Math Expression Parser with Plug-ins", Code Project, [Online]. Retrieved from the Internet: <URL: http://www.codeproject.com/Articles/7335/An-extensible-math-expression-parser-with-plug-ins>, (Mar. 13, 2008), 1-34.
Jenks, Stephen, et al., "Nomadic Threads: A Migrating Multithreaded Approach to Remote Memory Accesses in Multiprocessors", Parallel Architectures and Compilation Techniques, (Oct. 1996), 2-11.
Kahan, J., et al., "Annotea: an open RDF Infrastructure for Shared Web Annotations", Computer Networks vol. 39, No. 5, Elsevier Science Publishers B.V., Amsterdam, NL, (2002), 589-608.
Karp, Richard, et al., "A Simple Algorithm for Finding Frequent elements in Streams and Bags", ACM Transactions on Database Systems, vol. 28, No. 1, (Mar. 2003), 51-55.
Kitts, Paul, "Chapter 14: Genome Assembly and Annotation Process", The NCBI Handbook, (Oct. 2002), 1-21.
Leela, Krishna P, et al., "On Incorporating Iceberg Queries in Query Processors", Lecture Notes in Computer Science: Database Systems for Advanced Applications, vol. 2973, Springer Berlin Heidelberg, (2004), 431-442.
Liu, Hongyan, et al., "Methods for Mining Frequent Items in Data Streams: An Overview", Knowledge and Information Systems, vol. 26, No. 1, (Jan. 2011), 1-30.
Madden, "Chapter 16: BLAST Sequence Analysis Tool", The NCBI Handbook, (Oct. 2002), 1-15.
Mendes, Pablo, et al., "TcruziKB: Enabling Complex Queries for Genomic Data Exploration", IEEE International Conference on Semantic Computing, (Aug. 2008), 432-439.
Mizrachi, Ilene, "Chapter 1: GenBank: The Nuckeotide Sequence Database", The NCBI Handbook, (Oct. 2002), 1-14.
Plasil, Frantisek, "An Architectural View of Distributed Objects and Components in CORBA, Java RMI and COM/DCOM", Software—Concepts & Tools, vol. 19, No. 1, (Jun. 1998), 14-28.
Russell, Alastair, et al., "NITELIGHT: A Graphical Tool for Semantic Query Construction", University of Southhampton, UK, (2008), 1-10.
Sirotkin, Karl, et al., "Chapter 13: The Processing of Biological Sequence Data at NCBI", The NCBI Handbook, (Oct. 2002), 1-11.
Smart, Paul, et al., "A Visual Approach to Semantic Query Design Using a Web-Based Graphical Query Designer", 16th International Conference on Knowledge Engineering and Knowledge Management (EKAW), (2008), 16 pgs.
Stamos, James, et al., "Remote Evaluation", ACM Transactions on Programming Languages and Systems, vol. 12, No. 4, (Oct. 1990), 537-565.
Wollrath, Ann, et al., "A Distributed Object Model for the Java System", Proceedings of the 2nd Conference on USENEX, Conference on Object-Orients Technologies and Systems, (Jun. 1996), 219-231.
"5 Great Tools for Visualizing your Twitter Followers", Amnet Blog, http://www.amnetblog.com/component/content/article/115-5-great-tools-for-visualizing-your-twitter-followers.html, (Aug. 4, 2010), 1-5.
"About OWA", Open Web Analytics, [Online]. Retrieved from the Internet: <URL: http://www.openwebanalytics.com/?page jd=2>, (Accessed: Jul. 19, 2013), 5 pgs.
"An Introduction to KeyLines and Network Visualization", Keylines.com, [Online]. Retrieved from the Internet: <URL: http://keylines.com/wp-content/uploads/2014/03/KeyLines-White-Paper.pdf>, (Mar. 2014), 8 pgs.
"Analytics for Data Driven Startups", Trak.io, [Online]. Retrieved from the Internet: <URL: http://trak.io/>, (Accessed: Jul. 18, 2013), 3 pgs.
"Beta Testing on the Fly", TestFlight, [Online]. Retrieved from the Internet: <URL: https://testflightapp. com/>, (Accessed: Jul. 18, 2013), 3 pgs.
"Countly", Countly Mobile Analytics, [Online]. Retrieved from the Internet: <URL: http://count.ly/products/screenshots, (accessed Jul. 18, 2013), 9 pgs.
"Data Powered Mobile Advertising", Free Mobile App Analytics and various analytics related screen shots, (Jul. 18, 2013), 8 pgs.
"DISTIMO—App Analytics", [Online]. Retrieved from the Internet: <URL: http://www.distimo.com/app-analytics, (accessed Jul. 18, 2013), 5 pgs.
"Flurry Analytics", [Online]. Retrieved from the Internet: <URL: http://www.flurry.com/, (accessed Jul. 18, 2013), 14 pgs.
"Google Analytics Official Website—Web Analytics & Reporting", [Online]. Retrieved from the Internet: <URL: http ://www.google.com/ analytics/index.html, (accessed Jul. 18, 2013), 22 pgs.
"Help File for ModelRisk Version 5—Part 1", Vose Software, (2007), 375 pgs.
"Help File for ModelRisk Version 5—Part 2", Vose Software, (2007), 362 pgs.
"Hunchlab: Heat Map and Kernel Density Calculation for Crime Analysis", Azavea Journal, [Online]. Retrieved from the Internet: <www.azavea.com/blogs/newsletter/v4i4/kernel-density-capabilities-added-to-hunchlab>, (Sep. 9, 2014), 2 pgs.
"KeyLines Datasheet", Keylines.com, [Online]. Retrieved from the Internet: <URL: http://keylines.com/wp-content/uploads/2014/03/KeyLines-datasheet.pdf>, (Mar. 2014), 2 pgs.
"Mixpanel: Actions speak louder than page views", Mobile Analytics, [Online]. Retrieved from the Internet: <URL: https://mixpanel.com/>, (Accessed: Jul. 18, 2013), 13 pgs.
"Mobile App Marketing & Analytics", Localytics, [Online]. Retrieved from the Internet: <URL: http://www.localytics.com/>, (Accessed: Jul. 18, 2013), 12 pgs.
"Mobile Web", Wikipedia, [Online] retrieved from the internet:https://en.wikipedia.org/w/index.php?title=Mobile Web&oldid=643800164, (Jan. 23, 2015), 6 pgs.
"More than android analytics", UserMetrix, [Online]. Retrieved from the Internet: <URL: http://usermetrix.com/android-analytics>, (Accessed: Jul. 18, 2013), 3 pgs.
"More Than Mobile Analytics", Kontagent, [Online]. Retrieved from the Internet: <URL: http://www. kontagent. com/>, (Accessed: Jul. 18, 2013), 9 pgs.
"Multimap", Wikipedia, [Online]. Retrieved from the Internet: <URL: https://en.wikipedia.org/w/index.php?title=Multimap&oldid=530800748>, (Jan. 1, 2013), 2 pgs.
"Piwik—Free Web Analytics Software", Piwik, [Online]. Retrieved from the Internet: <URL: http://piwik.org/>, (Accessed: Jul. 19, 2013), 18 pgs.
"Realtime Constant Customer Touchpoint", Capptain—Pilot your apps, [Online] retrieved from the internet: <http://www.capptain.com>, (accessed Jul. 18, 2013), 6 pgs.
"Refresh CSS ellipsis when resizing container", Stack Overflow, [Online]. Retrieved from the Internet: <URL: http://stackoverflow.com/questions/17964681/refresh-css-ellipsis-when-resizing-container>, Accessed: May 18, 2015, (Jul. 31, 2013), 1 pg.

(56) References Cited

OTHER PUBLICATIONS

"SAP BusinessObjects Explorer Online Help", SAP BusinessObjects, (Mar. 19, 2012), 68 pgs.
"Smart Thinking for Super Apps", [Online]. Retrieved from the Internet: <http://www.appacts.com>, (Jul. 18, 2013), 4 pgs.
"Visualizing Threats: Improved Cyber Security Through Network Visualization", Keylines.com, [Online] retrieved from the internet: <http:/ /keylines.com/wp-content/uploads/2014/04/Visualizing-Threats1.pdf>, (May 12, 2014), 10 pgs.
"Welcome to StatCounter—Visitor Analysis for Your Website", StatCounter—Free Invisible Web Tracker, Hit Counter and Web Stats, [Online]. Retrieved from the Internet: <URL: http://statcounter.com/>, (Accessed: Jul. 19, 2013), 17 pgs.
Andrew, G. Psaltis, "Streaming Data—Designing the real-time pipeline", vol. MEAP V03, (Jan. 16, 2015), 12 pgs.
Celik, T, "CSS Basic User Interface Module Level 3 (CSS3 UI)", Section 8; Resizing and Overflow, [Online] retrieved from the internet: <http://www.w3.org/TR/2012/WD-css3-ui-20120117/#resizing-amp-overflow>, (Jan. 17, 2012), 1-58.
Chaudhuri, Surajit, et al., "An Overview of Business Intelligence Technology", Communications of the ACM, vol. 54, No. 8., (Aug. 2011), 88-98.
Cohn, David, et al., "Semi-supervised Clustering with User Feedback", Cornell University, (2003), 9 pgs.
Gill, Leicester, et al., "Computerised linking of medical records: methodological guidelines", Journal of Epidemiology and Community Health 1993; 47, (Feb. 1993), 316-319.
Gorr, et al., "Crime Hot Spot Forecasting: Modeling and Comparative Evaluation", Grant 98-IJ-CX-K005, (May 6, 2002), 37 pgs.
Gu, Lifang, et al., "Record Linkage: Current Practice and Future Directions", (Jan. 15, 2004), 32 pgs.
Hansen, D., et al., "Analyzing Social Media Networks with NodeXL: Insights from a Connected World", Chapter 4, pp. 53-67 and Chapter 10, pp. 143-164,, (Sep. 2010), 53-67; 143-164.
Hua, Yu, et al., "A Multi-attribute Data Structure with Parallel Bloom Filters for Network Services", HiPC 2006, LNCS 4297, (2006), 277-288.
Janssen, Jan-Keno, "Wo bist'n du?—Googles Geodienst Latitude", Not in English, [Online] retrieved from the internet:http://www.heise.de/artikel-archiv/ct/2011/03/086/@00250@/ct.11.03.086-088.pdf, (Jan. 17, 2011), 86-88.
Manno, et al., "Introducing Collaboration in Single-user Applications through the Centralized Control Architecture", (2010), 10 pgs.
Phillip, J Windley, "The Live Web: Building Event-Based Connections in the Cloud", Course Technology PTR, (Dec. 21, 2011), 61 pgs.
Sigrist, Christian, et al., "PROSITE, a Protein Domain Database for Functional Characterization and Annotation", Nucleic Acids Research, vol. 38, (2010), D161-D166.
Valentini, Giorgio, et al., "Ensembles of Learning Machines", Lecture Notes in Computer Science: Neural Nets, Springer Berlin Heidelberg, (Sep. 26, 2002), 3-20.
Wang, Guohua, et al., "Research on a Clustering Data De-Duplication Mechanism Based on Bloom Filter", IEEE, (2010), 5 pgs.
Winkler, William E, et al., "Bureau of the Census Statistical Research Division Record Linkage Software and Methods for Merging Administrative Lists", Statistical Research Report Series, No. RR2001/03, (Jul. 23, 2001), 11 pgs.

\* cited by examiner

US 10,509,844 B1

NETWORK GRAPH PARSER

PRIORITY APPLICATION

This application claims priority to U.S. Provisional Application Ser. No. 62/448,081, filed Jan. 19, 2017, the disclosure of which is incorporated herein in its entirety by reference.

TECHNICAL FIELD

Embodiments of the present disclosure relate generally to pattern detection and, more particularly, but not by way of limitation, to manipulating data via a network graph parser to expose previously undetected patterns.

BACKGROUND

A code repository website allows users to publish software code projects to the website so that other users can access, view, edit, or otherwise use the published software code. Identifying how different projects (e.g., software coding projects) are related to one another is currently impractical because the project data on the code repository websites is largely unstructured.

BRIEF DESCRIPTION OF THE DRAWINGS

Various ones of the appended drawings merely illustrate example embodiments of the present disclosure and should not be considered as limiting its scope.

DETAILED DESCRIPTION

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

In various example embodiments, a network graph parser is implemented to parse data from websites (e.g., code repository websites) into human understandable patterns. According to some example embodiments, the code repository websites are websites or network-based publication platforms (e.g., Internet forums) that allow users to publish data viewable by other users of the website or platform. For example, a software developer can create a project page on a code repository site and publish his/her code for the project to the project page. Other uses may navigate to the project page, view, download, or modify the code for the projects.

According to some example embodiments, the network graph parser is installed as a browser plugin of an Internet browser application. A data analyst may navigate to a given page on a repository website projects, such as a page created or associated with the project or a contributor. The analyst may then trigger the parse operation by selecting a browser plugin button. The parse operation goes through the page and saves data on the page and on related pages. For example, the network graph parser may identify links to projects listed on the repository website. In some embodiments, the network graph parser may navigate to each of the projects.

The saved data may be used to generate a visual representation (e.g., a network graph) of the collected data. The data analyst may manipulate the visual representation to explore patterns. Further, the data analyst may hone down onto specific subsets by issuing filter instructions. For example, the data analyst may filter out any connections that don't have at least two connections to other nodes. Contributors may have connections to one another by working together on the same coding project, as an example. The various filter instructions expose previously invisible patterns in the network graph. The honed down data containing the pattern can then be exported over a network to a data analysis server for further analysis, according to some example embodiments.

Figure 1:
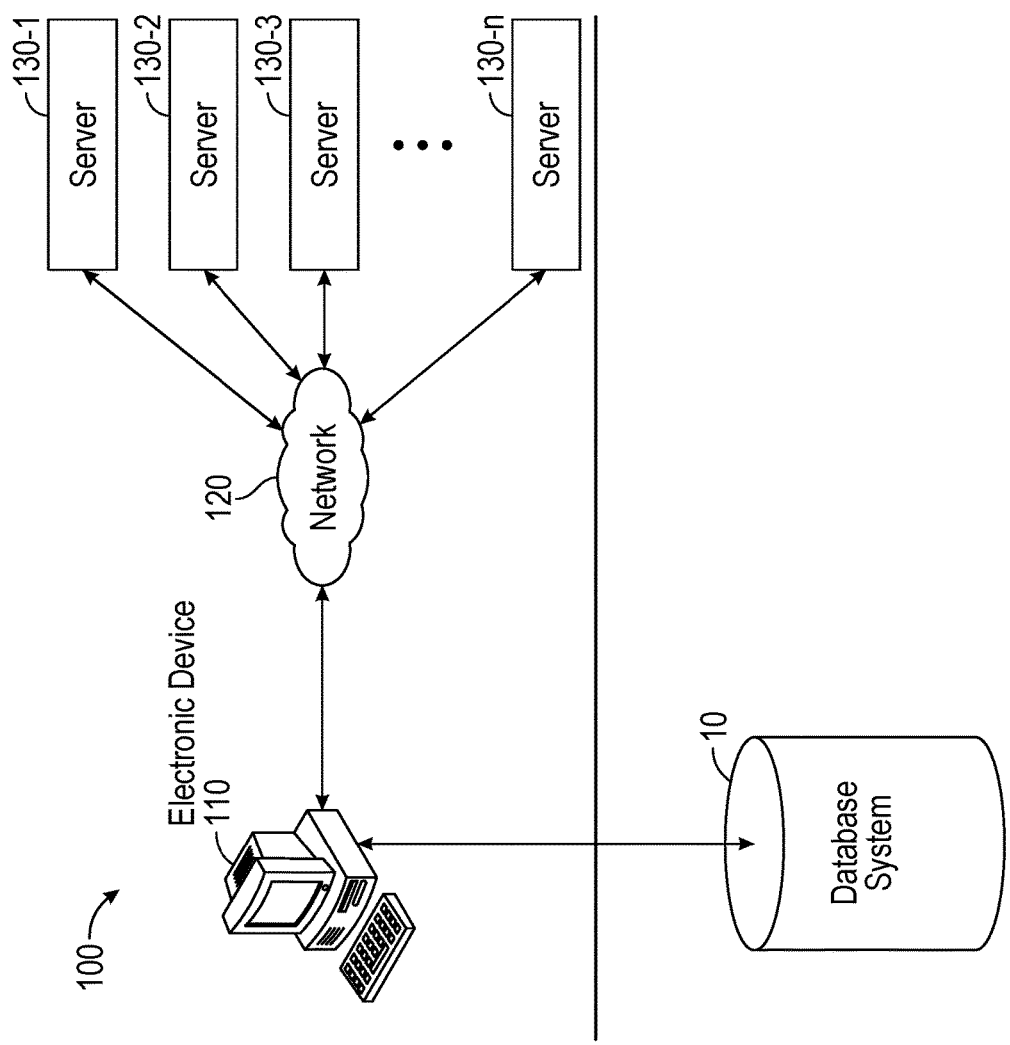
FIG. 1 is a block diagram illustrating a networked system in which a network graph parser can be implemented, according to some example embodiments.

FIG. 1 is a block diagram depicting a networked system 100 comprising an electronic device 110, and one or more components external to the electronic device 110. These external components include a database system 10, network 120, and a plurality of repository servers 130-1 to 130-n, that host repository websites. According to some example embodiments, the electronic device 110 is a client device, such as a personal computer, a tablet computer, a personal digital assistant (PDA), a mobile phone, a smart-phone, or any other web-enabled computing device with a processor and a memory. The electronic device 110 has installed thereon a web browser application (e.g., web browser 1632 in FIG. 16), on which is installed a network graph parser. According to some example embodiments, the network graph parser is integrated into the web browser application as a plugin or browser extension. Each of the plurality of repository servers 130-1 to 130-n comprises hardware and software. Each of the plurality of repository servers 130-1 to 130-n is able to communicate with the electronic device 110 via the network 120.

In some embodiments, some of the plurality of repository servers 130-1 to 130-n can be a part of a cloud, which can include, for example, one or more networked servers. Such networked servers may be termed a data center or a server farm. Such data centers currently are maintained by various communication network service providers. Network 120 can be, for example, the Internet, an intranet, a local area network, a wide area network, a campus area network, a metropolitan area network, an extranet, a private extranet, or a combination of any of these or other appropriate networks.

For the exemplary embodiment of FIG. 1, it is understood that the electronic device 110 is separate from the external database system 10 but connected thereto by a link. Alternatively, the database system 10 may be disposed in an air-gapped, high-side environment, where the database system 10 is physically isolated from the network 120 and the electronic device 110, such that a higher level of classified information can be maintained in the database system 10.

The electronic device 110 may be implemented by one or more specially configured computing devices. The electronic device 110 may be hard-wired to perform the operations, techniques, etc. described herein. The electronic device 110 can include digital electronic devices such as one or more application-specific integrated circuits (ASICs) or field programmable gate arrays (FPGAs) that are persistently programmed to perform the operations, techniques, etc. described herein. The electronic device 110 can include one or more general purpose hardware processors (including processor circuitry) programmed to perform such features of the present disclosure pursuant to program instructions in firmware, memory, other storage, or a combination. The electronic device 110 can also combine custom hard-wired logic, ASICs, or FPGAs with custom programming to accomplish the methods and other features.

The electronic device 110 can be generally controlled and coordinated by operating system software, such as iOS, Android, Blackberry, Chrome OS, Windows XP, Windows Vista, Windows 7, Windows 8, Windows Server, Windows CE, Unix, Linux, SunOS, Solaris, VxWorks, or a proprietary operating system. The operating system controls and schedules computer processes for execution, perform memory management, provide file system, networking, I/O services, and provides a user interface functionality, such as a graphical user interface ("GUI"), among other things.

Figure 2:
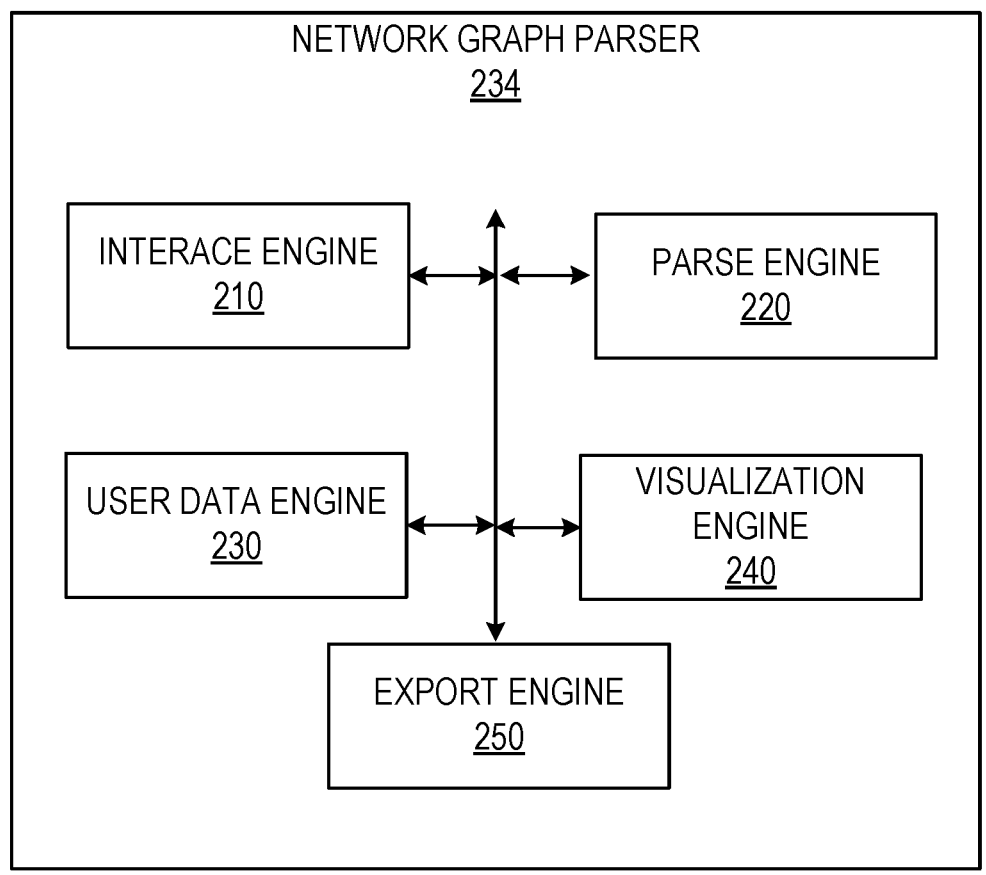
FIG. 2 is a block diagram showing functional components provided within the network graph parser, according to some example embodiments.

FIG. 2 shows internal functional components of the network graph parser 234, according to some example embodiments. In the illustrated embodiment, the network graph parser is implemented as a plug-in or browser extension for a web browser. As illustrated, the network graph parser 234 comprises an interface engine 210, a parse engine 220, a node data engine 230, a visualization engine 240, and an export engine 250. The interface engine 210 is configured to interface with the browser 1632 as a plugin. Further, the interface engine 210 is configured to interface with entities outside the electronic device 110, such as the repository server 130. The parse engine 220 is configured to parse node data from a code project webpage. Node data is data of an object associated with a given project. In some example embodiments, the node data is user data (e.g., data of software developers) associated with a given project, where each user may be involved in several different software projects. In some example embodiments, the node data includes code portions (e.g., classes, functions) shared between different projects. For example, two different projects may share an Optical Character Recognition (OCR) class, and the OCR class code can be used as a node associated with each software project's network graph, as discussed in further detail below. As a further example, according to some example embodiments, metadata describing an object (e.g., code portion) may be used as a node associated with each software project's network graph.

In some example embodiments, where the repository website is configured to provide node data, the parse engine 220 is configured to send node data requests for the users of the repository website. The repository website can receive the requests and issue responses including the requested node data. The node data engine 230 is configured to process the node data received via the code projects webpage (e.g., via spidering) or received from the repository website. The node data engine 230 can receive filter instructions from a user and cull (e.g., refine) the node data by removing data of users that do not meet the requirements of the filter instruction, as explained in further detail below. The visualization engine 240 is configured to use the initial node data or the refined node data and generate different types of visualizations for display on the display screen of the electronic device 110. The visualizations may include a network graph, a histogram, graphs such bar charts or data plots, and other visualizations. The export engine 250 is configured to export the refined dataset to an analysis server for further analysis.

Figure 3:
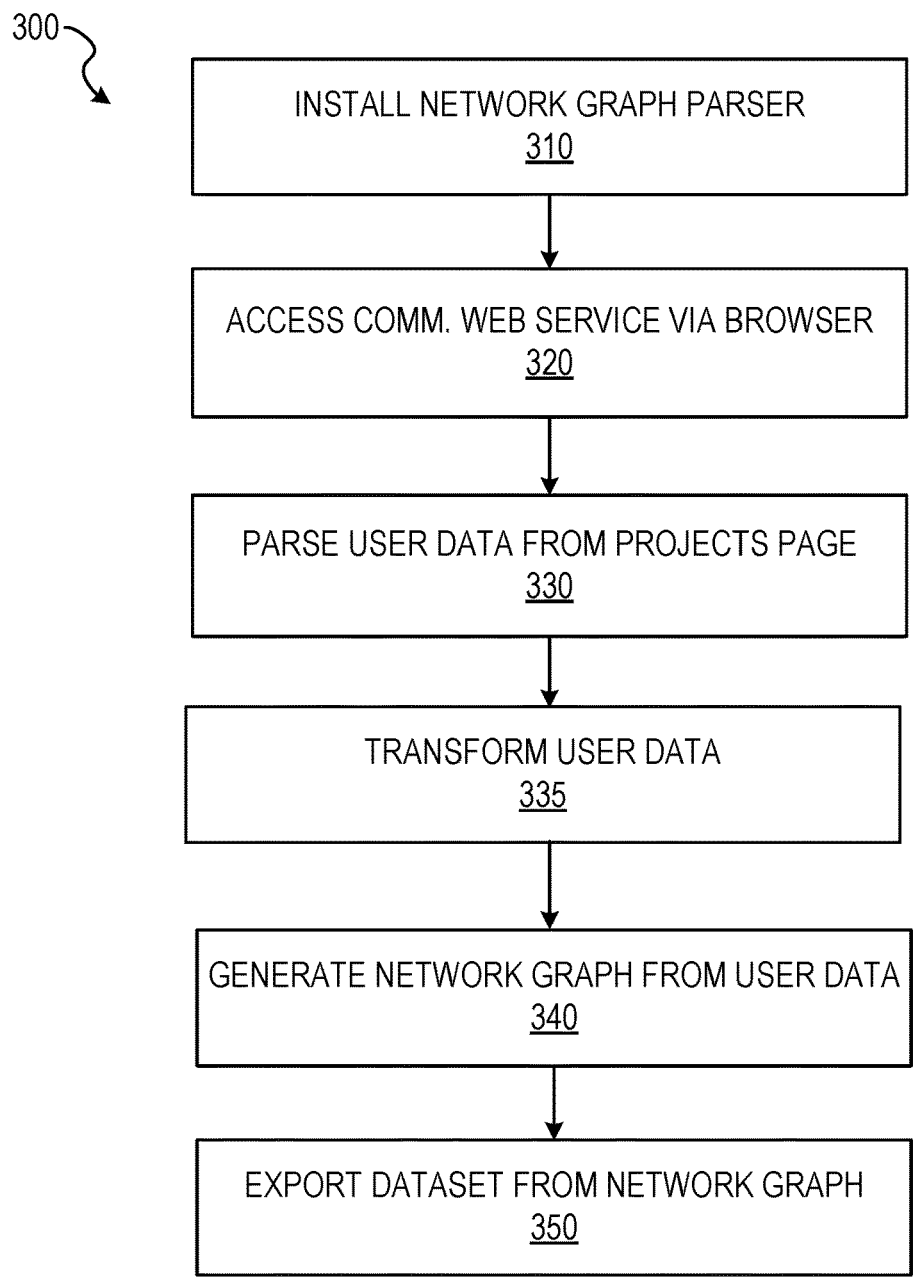
FIG. 3 shows a flow diagram for generating node data for export, according to some example embodiments.

FIG. 3 is a flowchart representing an exemplary method 300 performed by an electronic device for collecting and analyzing data from repository website systems, according to some example embodiments. While the flowchart discloses the following operations in a particular order, it will be appreciated that at least some of the operations can be moved, modified, or deleted where appropriate, consistent with the teachings of the present disclosure. In the depicted embodiment of FIG. 3, a user can utilize an electronic device (e.g., electronic device 110) that comprises a web browser 1632, for example, Google™ Chrome™, Mozilla™ Firefox™, Microsoft™ Internet Explorer™, etc. The web browser 1632 is usable to access web content (e.g. provided by the repository servers 130-1 to 130-n) via a network (e.g., network 120), such as the Internet or an intranet.

At operation 310, a network graph parser 234 is installed as a plugin in the web browser 1632 of the electronic device. The network graph parser 234 may be termed a browser extension, according to some example embodiments. The network graph parser 234 extends the functionality of the web browser 1632, as is described in detail below. The network graph parser 234 may be authored using a web technologies such as HTML, JavaScript, or CSS (Cascading Style Sheets).

Referring again to FIG. 3, at operation 320, the interface engine 210 accesses communication and node data related content from a repository server 130 (e.g., one of the repository servers 130-1 to 130-n) using the web browser 1632. In the following description, reference is made generally to accessing content from a repository server 130, and it will be appreciated that, unless the context indicates otherwise, such references are to accessing content from a particular repository server 130, for instance the first repository server 130-1.

According to some example embodiments, the repository server 130 is accessed through the browser 1632 causing sending of a request (e.g. an HTTP request) to the repository server 130 (in particular to a webserver included as part thereof.

Once the user has accessed the repository server 130 using the browser 1632, they may control the browser 1632 to interact with the repository server 130 using user interface controls provided in the browser 1632 by the network graph parser 234 or using controls provided by the browser itself. In some example embodiments, the information received from the repository webservice comprises a projects webpage showing different coding or software projects associated with a user of the repository webservice.

At operation 330, the parse engine 220 parses the data from the projects webpage and stores the data in local memory of the electronic device 110. According to some example embodiments, node data is a user profile and relates to an entity that is included as part of the repository network service provided by the repository server 130. Further, according to some example embodiments, an entity typically relates to an individual programmer, but may relate to an organization, for instance a business or other group. In some example embodiments, a software developer profile includes at least a unique identifier (the identifier uniquely identifies the entity on the repository service), a name for the entity (typically a string of text, perhaps alphanumeric characters) and a plurality of links between the entity and other entities that form part of the repository webservice.

The links may be bidirectional in nature. For example, two software developers may collaborate on the same code project. Because the two developers work on the same coding project, they may be bidirectionally linked under the assumption that each knows of the other as a fellow coder (e.g., team member, colleague) on the project. The links may alternatively be unidirectional, e.g., the first software developer receives updates published by the second software developer but the second software developer does not receive updates published by the first software developer. In some embodiments, the data stored on the repository website indicates the type of communication activity between the users. For example, the node data may include an indication that a first user commented on a pending code update on a project page on the repository website. The links may indicate the another entity by including a identifier that is unique to the other entity. Typically, repository webservices provide an identifier that is an alphanumeric string. The string may be known to the entity and other users (e.g. it may be their username) or it may be a system-generated identifier which does not need to be known to the user (e.g. a string such as "exampleidentifier$43*"). The profile may also include a uniform resource locator (URL) that is unique to the entity.

A user profile of the repository website may also have other information associated with pre-defined fields, for instance 'high school attended', 'place of residence', 'place of work', 'undergraduate study subject', etc. The profile may also have other content such as photographs, videos, comments or profile text, etc. Profile content may be associated with particular dates (and as such may appear in a timeline on a user's profile page) or may not be dependent on a date (and so may not generally appear on a timeline). In some embodiments, profile content may be associated with geotagged data.

In some example embodiments, user profiles are imported in response to user input. For example, a first profile is imported by the network graph parser 234 in response to the user selecting a first entity in the repository service. This may occur for instance by the user selecting a hyperlink in a code projects webpage provided by the repository server 130. The code projects webpage may be provided by the repository server 130 in response to the user entering text, e.g. the whole or part of a name on an entity, into a search field of a webpage provided by the by the repository server 130. The code projects webpage displays coding projects of the first entity, where each of the coding projects has its own projects webpage, which can be spidered as described above. According to some example embodiments, upon selection of the first entity, the network graph parser 234 sends a request to the repository server 130 identifying the first entity. In response, the repository server 130 provides the code projects webpage of the first entity, which is then parsed by the network graph parser 234. In some example embodiments, the network graph parser 234 extracts node data from the code projects webpage by accessing the source code (e.g., markup language) of the code projects webpage and then extracting the node data listed in the source code. The received node data is stored in volatile memory (e.g. RAM) allocated to the browser 1632, but is not stored in permanent memory, e.g. ROM.

After the node data of the first entity is imported by the network graph parser 234, or at least after importation has begun, the user selects a second entity. This may occur for instance by the user selecting a hyperlink relating to the second entity in a second code projects webpage provided by the repository server 130. Upon selection of the second entity, the network graph parser 234 sends a request to the repository server 130 identifying the second entity. In response, the repository server 130 provides a second code projects webpage that lists all the coding projects for the second entity on the repository server. The parse engine 220 then parses the source code of the second code projects webpage to extract additional node data of the users associated with the second entity (e.g., users that have worked on the same coding project as the second entity). The received profile is stored in volatile memory (e.g. RAM) allocated to the browser 1632, but is not stored in permanent memory, e.g. ROM.

According to some example embodiments, the network graph parser 234 is configured to automatically import node data for entities to which the first and second entities are linked, e.g., for which links from the first and second entities exist. The parse engine 220 is configured to import such node data by sending requests to the repository server 130 identifying the further entities and navigating to the code projects webpages of the entities.

At operation 235, the node data engine 230 transforms the contributor data parsed from the projects webpage from a first format into a second format. For example, the underlying source code of the projects webpage may be a markup language, such as HTML. The node data parsed from the projects webpage may also be in the markup language format. The node data engine 230 is configured to transform the node data from the markup language format to an attribute-value format, such as JSON (JavaScript Object Notation). The node data in the second format can be used for filtering and generation of the visualizations.

At operation 340, the visualization engine 240 creates a visual representation from the parsed node data (e.g., node data in the attribute-value format). In some example embodiments, the visual representation is generated as a network graph in an additional tab of the browser 1632. The network graph includes a collection of nodes connected by edges. Each node corresponds to a user from one of the projects listed on a code projects webpage, and connections between individual nodes may be visually represented as lines, for example straight lines. In some example embodiments, two nodes are connected on the repository server if each of the nodes are associated with the same coding project. The graph may lend itself to be further processed, analyzed and manipulated by an analyst or other user. The details regarding operation 340 are explained in more detail later.

At operation 350, the export engine 250 exports the graph formed from the operation 340 to the database system 10. The database system 10 is connected to the electronic device 110 (as shown in FIG. 1), according to some example embodiments. Further, according to some example embodiments, the database system 10 is implemented as a backend system disposed in an air-gapped, high-side environment, separated from the network 120 and the electronic device 110. The database system 10 may be dedicated to receive data for further analysis. Therefore, network graph parser 234 of operation 340 can be used to collect and pre-process the data such that it is compatible with the database system 10.

Figure 4:
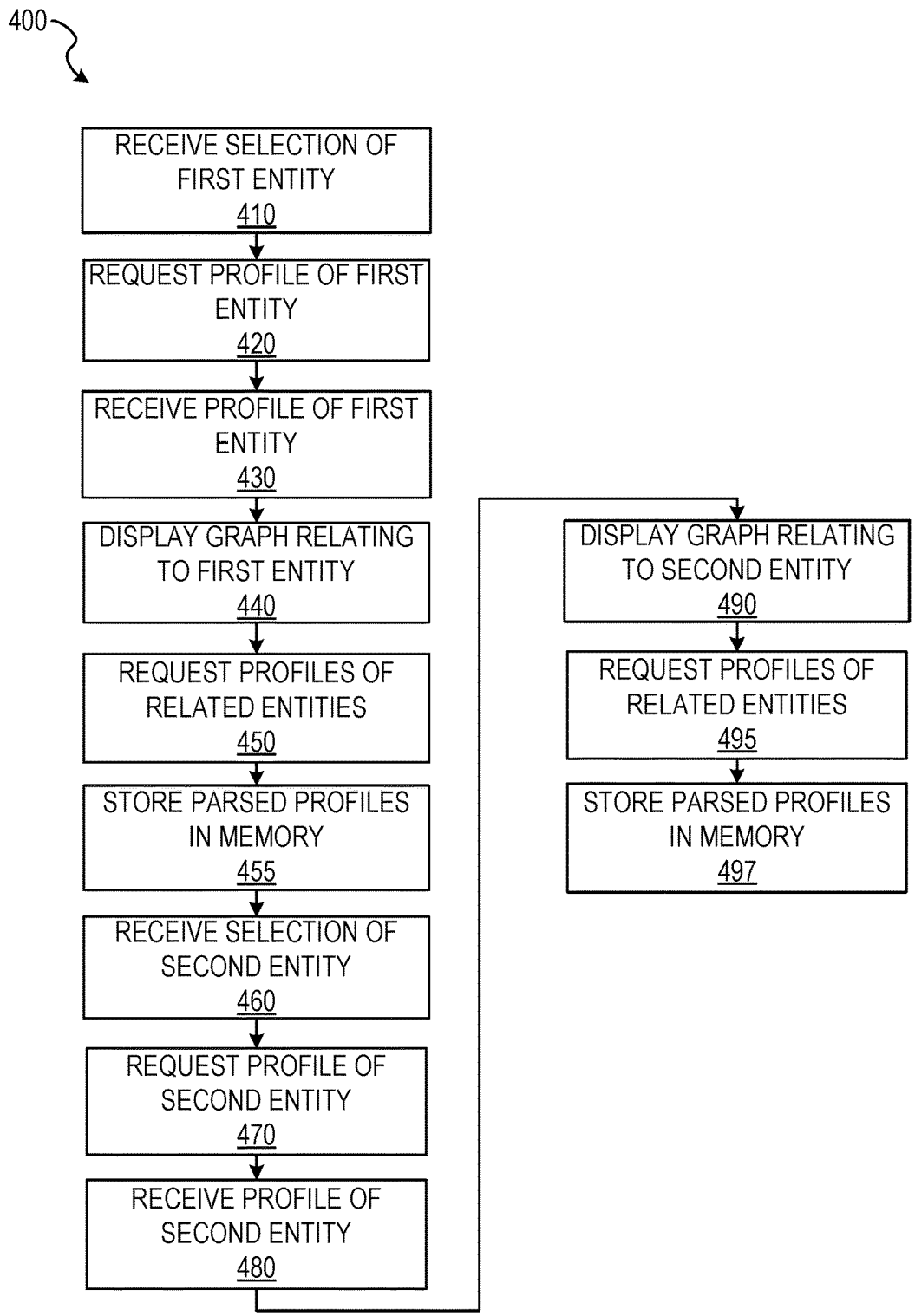
FIG. 4 shows a flow diagram for parsing node data from multiple selected entities, according to some example embodiments.
Figure 5A:
FIGS. 5A and 5B show example visualizations of node data, according to some example embodiments.
Figure 5B:
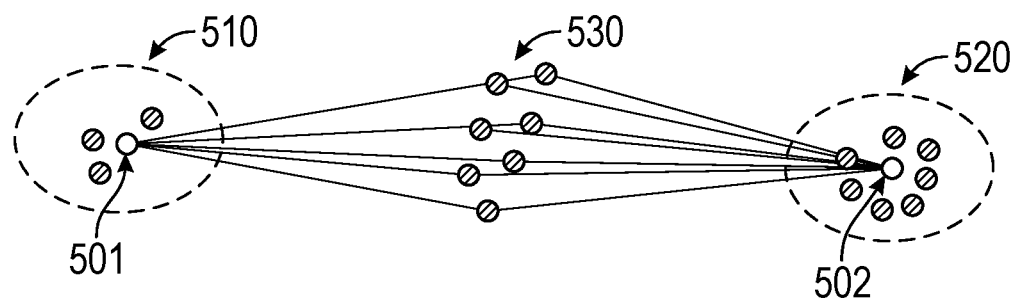

FIG. 4 is a flowchart representing a method 400 performed by the network graph parser 234 for importing node data of the first and second entities from the repository server 130 and for creating a graph, according to some example embodiments. The method 400 is an example of sub-operations performed to complete operations 330 and 340 of FIG. 3 discussed above. FIGS. 5A and 5B show an example of the graph created by the exemplary method 400.

At operation 410, the interface engine 210 receives selection of first entity through a user input, for instance through a bookmark, favorite, or through selection of an option provided in a list of search results. At operation 420, the interface engine 210 requests the profile of the first entity. This involves the network graph parser 234 accessing the repository server 130 via the network 120 and in particular accessing the first entity (e.g., projects webpage of the first entity) in the repository server 130. In particular, the network graph parser 234 may send an HTTP request to the repository server 130, the request including the unique identifier of the first entity.

At operation 430, the network graph parser 234 receives the profile or projects webpage of first entity. The profile is for example received as an HTTP response. According to some example embodiments, the profile includes a name for the first entity and details of connections of the first entity. The connections define links to other entities, and include unique identifiers for the other entities. In some example embodiments, one or more webpages of the first entity may be exposed through automatic scrolling of the one or more webpages. For example, a top portion of a first entity's webpage may be initially retrieved, and further portions below the top portions may be auto populated by script as those portions are scrolled to. In some example embodiments, the auto populated scrolled-to portions are received at operation 430.

At operation 440, the visualization engine 240 displays a graph relating to first entity. For example, the network graph parser 234 may display a group or 'cloud' of nodes, each node relating to an entity. The node relating to the first entity is displayed with different visible characteristics to nodes for other entities. For instance, it may be a different color or size. All the nodes for entities linked to the first entity are shown as being connected by the inclusion on the graph of a line, e.g. a straight line, connecting the node to the node for the first entity. In some embodiments, connections between nodes other than connections between the first entity and other nodes may not be displayed in the graph.

Further, in some example embodiments, a further entity (e.g., a second entity of operation 460) need not be specified for links between nodes to be created. For example, an entity associated with a given code repository page may be identified (e.g., at operation 410). The code repository page may list other coding projects with which the entity is involved (e.g., develops code). Each coding project may list other further entities associated with the given project. Using the identified entity, the additional projects and additional entities can all automatically be included in a single network graph, according to some example embodiments.

In the following discussion, the terms 'connected' and 'linked' in relation to entities included in the electronic repository website can be used interchangeably. FIG. 5A shows an example of parsing profiles of users. In the left panel of FIG. 5A, a node 501 is displayed as an empty circle. The node 501 corresponds to the first entity. Each of ten nodes displayed as a group around the node 501 represents a different entity to which the first entity is linked or connected, as identified from the profile of the first entity. Each such node in the group (other than the first node 501) is connected to the node 501 with a respective straight line, which represents a link between the corresponding two entities. In the following, a group of nodes connected to the first node 501 once by a single link in the created graph may be represented as being enclosed within a dotted circle, as shown in the right panel of FIG. 5A.

At operation 450, the network graph parser 234 begins requesting profiles of entities linked to by the first entity. In some example embodiments, the profiles are parsed from a code projects webpage of the first entity. For example, users associated with the first entity may be displayed in a projects webpage. The underlying markup language of the code projects webpage can be parsed to extract the username, user profile URL, and other information for each of the users associated with the first entity.

At operation 455, profiles of the entities are stored as they are received. In one embodiment, the profiles are stored in non-volatile memory that is allocated to the browser 1632. Profiles may continue to be requested and saved as a background task whilst the network graph parser 234 performs other tasks.

At operation 460, the interface engine 210 receives selection of a second entity. This may occur as described above in relation to receiving selection of the first entity.

At operation 470, the network graph parser 234 receives the profile of the second entity, after requesting the profile of the second entity. The profile is for example received as part of an http response. The profile includes at least a name for the second entity and details of connections of the second entity. The connections define links to other entities, and include unique identifiers for the other entities.

At operation 490, the visualization engine 240 displays a graph relating to the first and second entities. For example, the network graph parser 234 may display three groups (or clouds) of nodes 510, 520, 530, each node relating to an entity. The nodes 501 and 502 relating to the first and second entities are displayed with different visible characteristics to nodes for other entities. For instance, they may be a different color or size. Each node of the first group 530 of nodes corresponds to an entity linked to in the profiles of both the first and second entities. Each node of the second group 510 of nodes corresponds to an entity linked to by the profile of the first entity but not by the profile of the second entity. Each node of the third group 520 of nodes corresponds to an entity linked to by the profile of the second entity but not by the profile of the first entity. All the nodes for entities connected to the first entity are shown as being connected to the node 501 by the inclusion on the graph of a line, e.g. a straight line, connecting the node to the node for the first entity. All the nodes for entities connected to the second entity are shown as being connected to the node 502 by the inclusion on the graph of a line, e.g. a straight line, connecting the node to the node for the second entity. Connections between nodes other than connections between one of the node 501 and the node 502 and other nodes are not displayed in the graph.

At operation 490, the visualization engine 240 creates a new graph after removing the graph as shown in FIG. 5A. Alternatively, the network graph parser 234 may augment and rearrange the graph created at operation 440. An example of the created graph at operation 490 is shown in FIG. 5B. Nodes 501 and 502 represent the first entity and the second entity, respectively. Third group 510 comprising seven nodes (represented as filled circles), correspond to the entities linked to by both the first entity and the second entity. The second group 510 comprise only three nodes because seven nodes previously in the sole group now belong to the first group 530. The profile of the second entity includes links to fourteen entities. Seven entities linked to in the profile for the second entity belong to the first group 530, and the other seven entities belong to the third group 520. The nodes of the group from FIG. 5A is now split and rearranged into two groups, namely second group 510 and first group 530. Therefore, in displaying nodes corresponding to the entities linked to by the first entity 501 and second entity 502, accessed by the network graph parser 234, they are grouped into three groups: the second group 510 linked only to the first entity 501, the third group 520 linked only to the second entity 502, and the first group 530 linked both to the first entity 501 and second entity 502.

At operation 495, the interface engine 210 begins requesting profiles of entities linked to by the second entity. In some example embodiments, the operations of 450 and 495 (e.g., requests for profiles of related entities) are initiated by a manual user request. For example, after the user (at operation 420) requests profile of first entity, the user (at operation 450) further requests (e.g., using a GUI button) the profiles of entities related to the first entity. Further, according to some example embodiments, the operations of 450 and 495 are performed automatically by the network graph parser. For example, after the user (at operation 420) requests profile information of the first entity, the network graph parser 234 automatically retrieves and sends the profile information of the specified first entity but also retrieves and sends profile information of entities related to the first entity automatically (e.g., without the user manually initiating the request for profile information of the related entities).

At operation 497, profiles of the entities are stored as they are received. In one embodiment, the profiles are stored in volatile memory, e.g. the RAM 1606, that is allocated to the browser 1632. Profiles may continue to be requested and saved as a background task whilst the network graph parser 234 performs other tasks. Further, according to some example embodiments, the display operations of method 400 (e.g., operations 440 and 490) are bypassed until the some or all of the information collection operations (e.g., operations 410, 420, 430, 450, 455, 460, 470, 480, 495, and 497) are completed.

Figure 6:
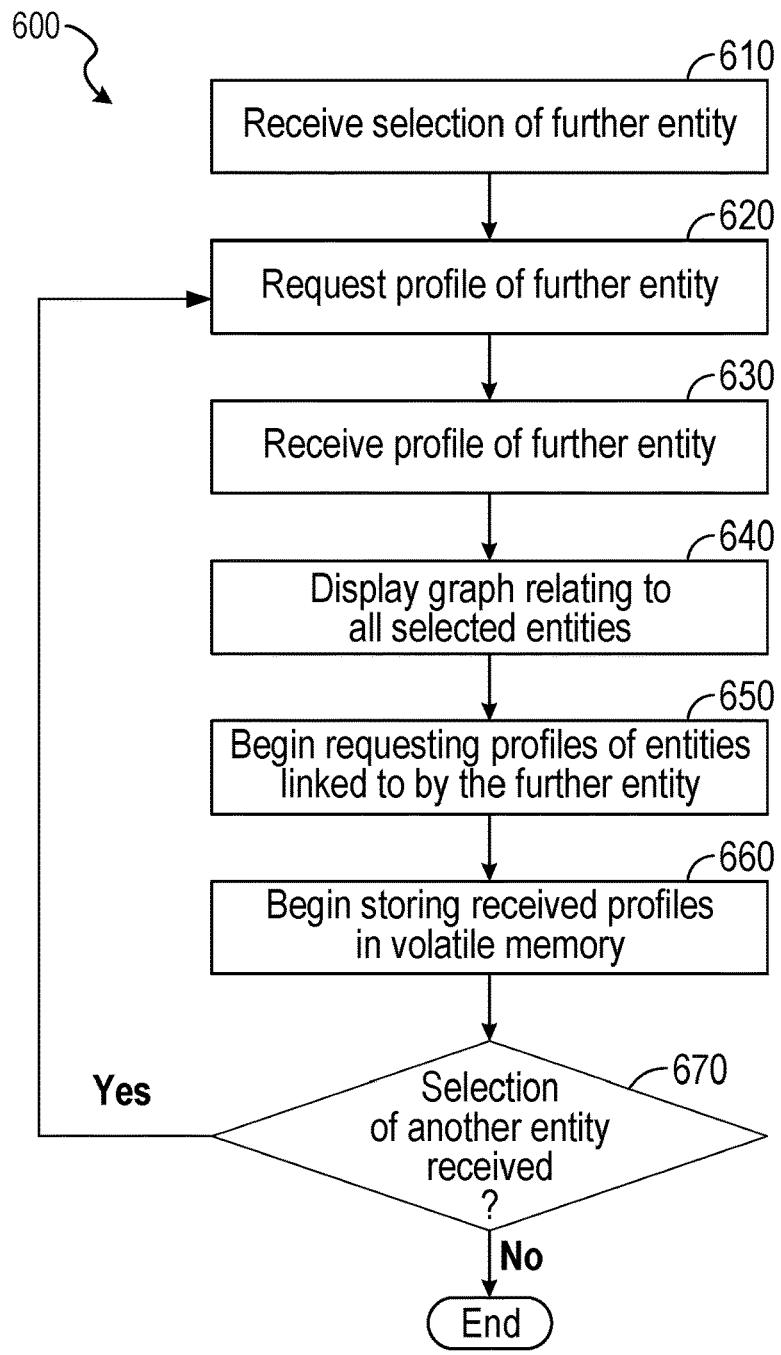
FIG. 6 shows a flow diagram for selecting entities, according to some example embodiments.

FIG. 6 is a flowchart showing a method 600 performed by the network graph parser 234 for importing further seed entities from the electronic repository website system hosted from the repository server 130 and for creating a graph, according to some example embodiments. This may correspond to at least part of operations 330 and 340 of FIG. 3, as discussed above.

Figure 7:
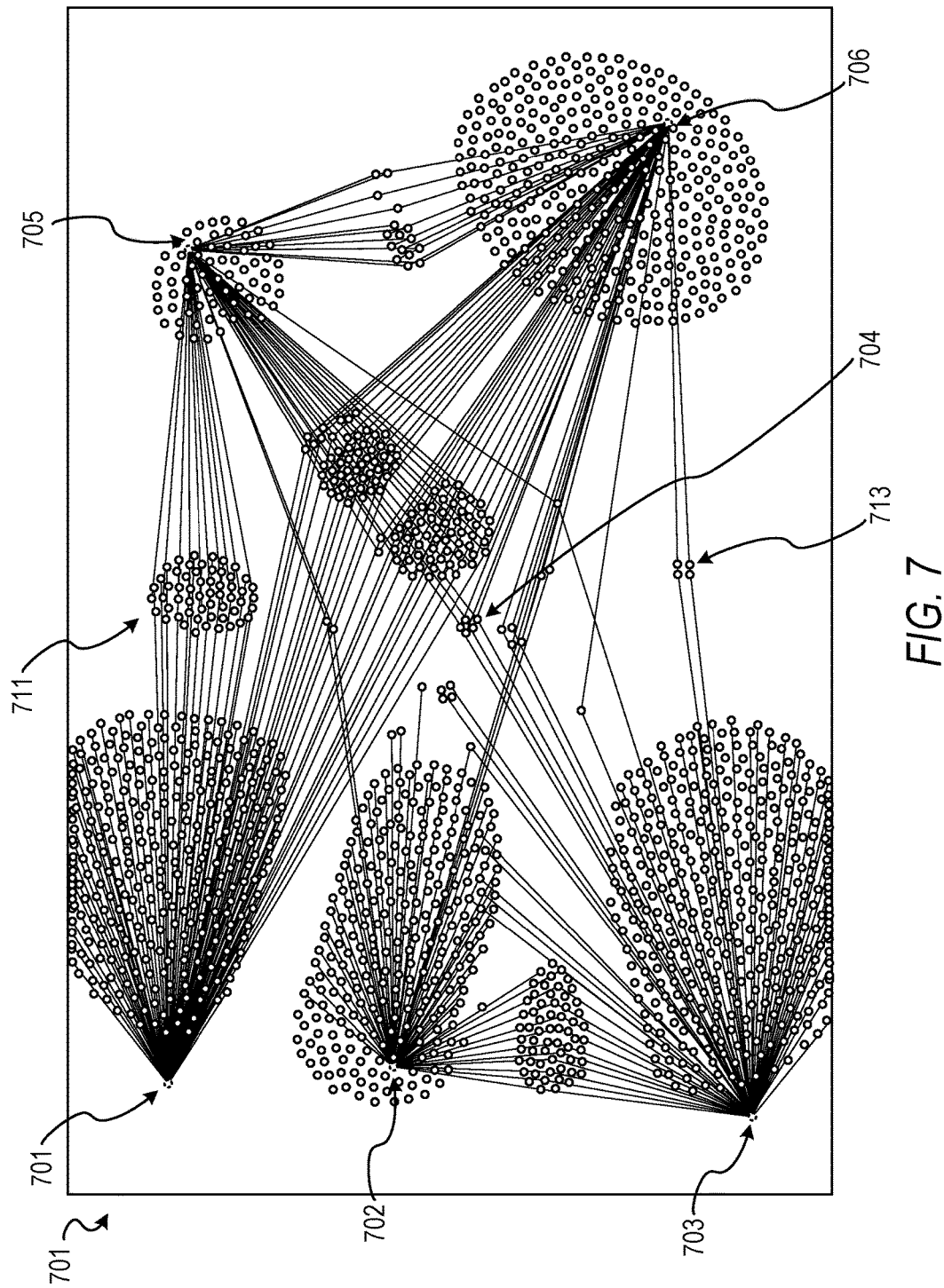
FIG. 7 shows example visualizations from node data of different selected entities, according to some example embodiments.

FIG. 7 shows an example of the graph created by the exemplary method 600. Prior to operation 610, the plugin is processing two or more entities, for instance as is shown in FIG. 5B and is present at the end of the flowchart of FIG. 4. At operation 610, the interface engine 210 receives selection of further entity through a user input, for instance through a bookmark, favorite or through selection of an option provided in a list of search results.

At operation 620, the interface engine 210 requests or parses the profile of the further entity. This is similar to operation 420. This involves the interface engine 210 accessing the repository server 130 via the network 120 and accessing first entity in one of the electronic repository webservice system in the repository server 130. In particular, the interface engine 210 may send an HTTP request to the repository server 130, the request including the unique identifier of the first entity. Alternatively, the network connection parser can parse a code projects webpage to extract profile information of user connected to the second entity.

At operation 630, the interface engine 210 receives the profile of the further entity. This is similar to operation 430. The profile is for example received as part of an HTTP response. The profile includes at least a name for the first entity and details of connections of the further entity. The connections define links to other entities, and include unique identifiers for the other entities.

At operation 640, the visualization engine 240 displays a graph relating to all the selected entities. Here, the visualization engine 240 may cause display of multiple groups (or clouds) of nodes, each node relating to an entity. Each group relates to a collection of nodes that have the same connections to the selected entities. Where there are three selected entities, there are seven groups. Each node of the first group of nodes corresponds to an entity linked to in the profiles of both the first and second entities, but not the third entity. Each node of the second group of nodes corresponds to an entity linked to by the profile of the first entity but not by the profile of the second or third entities. Each node of the third group of nodes corresponds to an entity linked to by the profile of the second entity but not by the profile of the first or third entities. Each node of the fourth group of nodes corresponds to an entity linked to in the profiles of both the first and third entities, but not the second entity. Each node of the fifth group of nodes corresponds to an entity linked to by the profile of the second and third entities but not by the profile of the first entity. Each node of the sixth group of nodes corresponds to an entity linked to by the profiles of the second and third entities but not by the profile of the first entity. Each node of the seventh group corresponds to an entity linked to by each of the first, second and third entities. One or more of the groups may not exist, if there are no nodes that meet the criteria for that group (these groups might be said to have zero nodes).

The nodes relating to the selected entities are displayed with different visible characteristics to nodes for other entities. For instance, they may be a different color or size. All the nodes for entities connected to the one of the selected entities are shown as being connected by the inclusion on the graph of a line, e.g. a straight line, connecting the node to the node for the selected entity. Where a non-selected node has links to multiple selected entities, there is a line for each such connection. In some embodiments, connections between two nodes that relate to non-selected entities may be hidden or not displayed in the graph. In some example embodiments, the graph may simplify or de-clutter the graph by hiding links between nodes and/or nodes based upon whether a give node or one of its neighbors is selected. For example, if the user selects a given node, the visualization engine may only display notes that are directly linked to the given node.

At operation 650, the interface engine 210 begins requesting profiles of entities linked to by the further entity. In some example embodiments, the user manually requests the profiles of entities linked to by the further entity. At operation 660, profiles of the entities are stored as they are received. In one embodiment, the profiles may be stored in volatile memory that is allocated to the browser 1632. Profiles may continue to be requested and saved as a background task whilst the network graph parser 234 performs other tasks. At operation 670, the operation may check whether another entity has been selected by the user. If so, the operation returns to operation 620, where the profile for the further selected entity is requested. Further, in some example embodiments, the selections of additional entities are processed in batches. For example, instead of requesting information of a single further entity and then receiving the information of the single further entity (e.g., method 600), the user can select a plurality of entities, then request their information as a batch process (e.g., as part of a single request).

Further, according to some example embodiments, the display operation of method 600 may be bypassed or delayed until other operations are complete. For example, operation 650 (an information collection related operation) may be performed before operation 640 (a display related operation). As a further example, the information collected at operation 650 may be stored to memory and operation 640 is bypassed and a display is never generated).

FIG. 7 shows a screenshot of an example of graph generated by the visualization engine 240, according to some example embodiments. Here, six nodes 701, 702, 703, 704, 705 and 706 correspond to six entities that have been selected by a user. The nodes 701, 702, 703, 704, 705 and 706 corresponding to user-selected entities are displayed as empty circles. Entities linked to by the selected entities are represented as nodes, and are displayed as filled circles. A line connects each node pair representing linked entities if at least one of the linked entities is a user-selected entity. I It can be seen from FIG. 7 that nodes are grouped together depending on which one combination of the six user-selected entities they are linked to. For example, the group of nodes 711 correspond to non user-selected entities linked to two of the user-selected entities 701 and 705. Node 712 corresponds to the only non user-selected entity linked to by the user-selected entities 702, 703 and 706, hence the node 712 forms a group on its own. The group of nodes 713 includes nodes relating to entities linked to user-selected entities 703 and 706. Each group is displayed separated from other groups, e.g. with a gap between the groups which is visibly significantly larger than the gaps between adjacent nodes forming part of a single group. Each group is displayed separately from one another to aid visual recognition of groups representing different states of connection. In some example embodiments, each node is generated from node data from the same code repository website. In some example embodiments, some of the nodes are generated from node data from a first code repository website and some of the nodes are generated from node data from a second code repository website different from the first. In this way, an analyst user can determine relationships between nodes (e.g., software project data) across different code repository websites.

Figure 8:
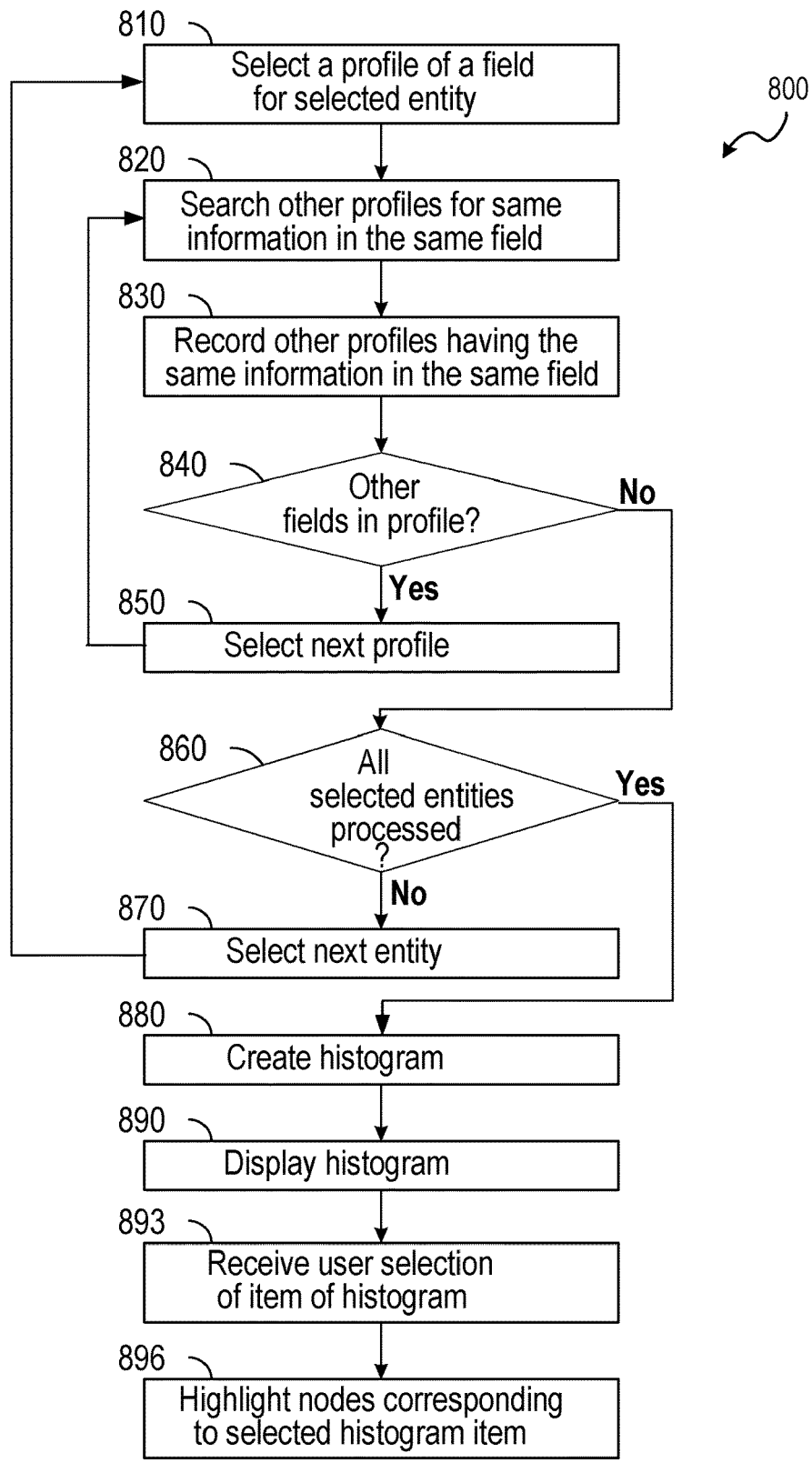
FIG. 8 shows an example flow diagram for processing entity data, according to some example embodiments.

FIG. 8 is a flowchart representing an exemplary method 800 performed by the network graph parser 234 to generate a list in the form of a histogram from the imported profiles. The method 800 is performed when a graph relating to at least one selected entity is provided for display by the network graph parser 234 and when the profiles for all of the selected entities and the entities linked to the selected entities have been received from the repository server 130. The histogram may be provided in response to a user input selecting a histogram option, for instance through interaction with a user interface element in a sidebar, dock, pull-down menu etc.

Figure 9:
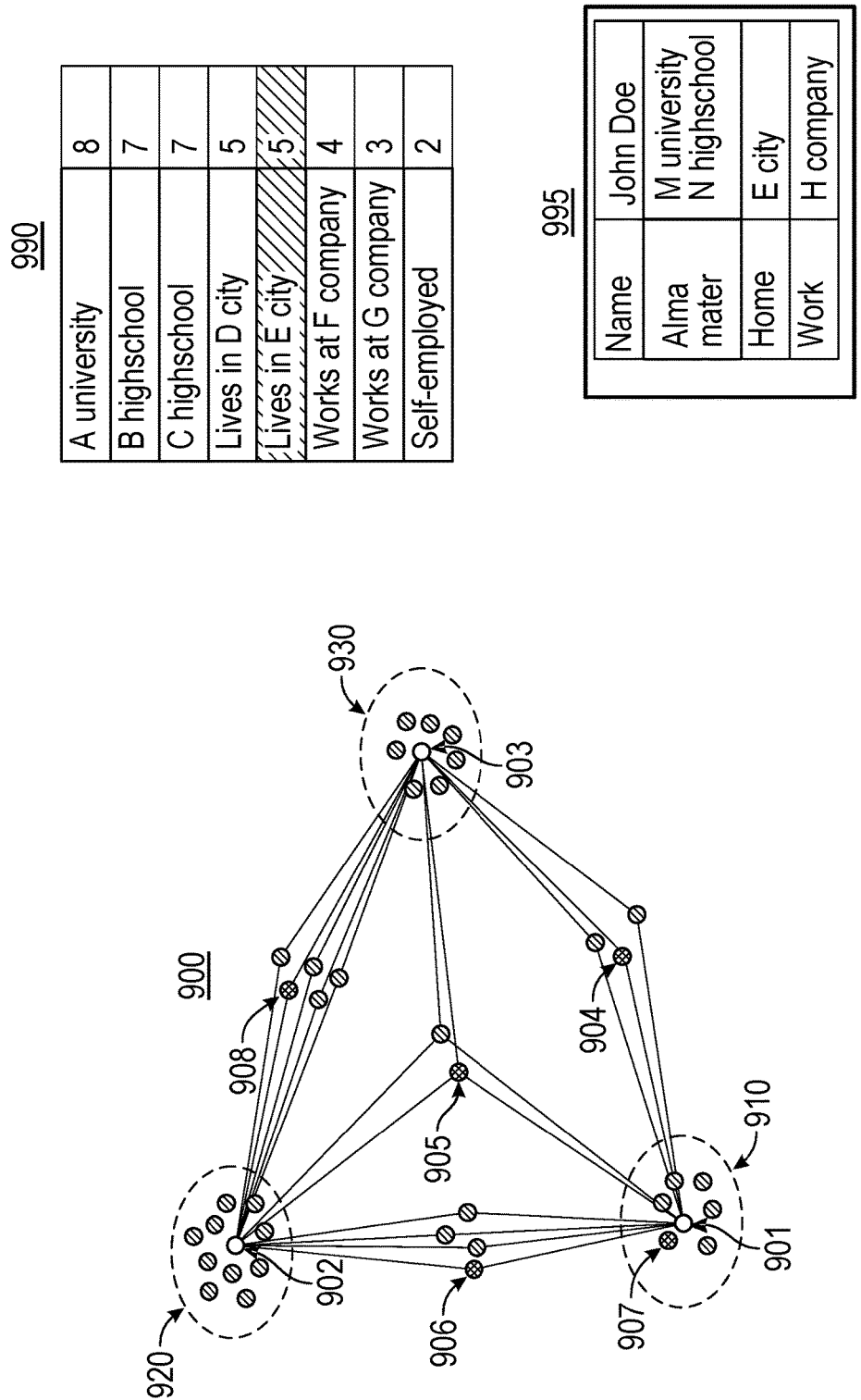
FIG. 9 shows example visualizations, according to some example embodiments.

FIG. 9 shows an example of a graph 900 generated by the method 600. It also shows an example of a histogram 990 created by the exemplary method 800. It further shows a profile viewer 995 generated by selecting a node displayed in the graph 900. The graph 900, the histogram 990, and the profile viewer 995 are displayed at the same time on different parts of the display 212, for instance in the layout shown in the Figure. The graph 900 has been generated from the imported profiles of three user-selected entities, corresponding to displayed nodes 901, 902 and 903. As explained in FIG. 5a and the accompanying paragraphs above, the circles 910, 920 and 930 represents first, second, third group of nodes corresponding to entities directly linked only to the user-selected entity nodes 901, 902, 903, respectively. There are three more groups of nodes 904, 906, 908, which correspond to entities linked to only two of the selected entities 901, 902 and 903. There is one group 905 of nodes linked to all three of the selected entities 901, 902 and 903.

At operation 810, the network graph parser 234 selects one of the fields of a profile relating to one of the selected entities 901, 902, 903. In this example, the profile contains fields of information common to all or many of the profiles such as place of birth, birth year, high school, and place of work.

At operation 820, the node data engine 230 then searches in all or selected imported profiles for profiles which have the same information in the same field. In particular, the node data engine 230 identifies which fields of the profile of the selected entity are populated. For a populated field, the plugin extracts the information (text, numbers or text and numbers) from the profile and searches the corresponding field of all the other profiles for the same information. Since the profiles for the entities are stored in the volatile memory allocated to the browser 1632, this searching can be relatively fast.

At operation 830, the node data engine 230 generates a record indicating any other entity which has the same information in the same field of the profile. The record is made in the working (volatile) memory 206 allocated to the web browser 1632.

At operation 840, the node data engine 230 determines whether there are other fields in the profile for the selected entity that include information and that have yet to be processed. If there are such other fields, then the method proceeds to operation 850, where another field is selected, before the method returns to operation 820. If all the fields have been processed, the method proceeds to operation 860.

At operation 860, the node data engine 230 determines whether all the selected entities have been processed. If not, then the next entity is selected for processing at operation 870 and the method then returns to operation 810. If so, then at operation 880 the visualization engine 240 generates a histogram from the processed data. According to some embodiments, operation 880 is reached only when all completed fields for the selected entities (the entities which have been selected by a user in the method 300, the method 400 or the method 600).

According to some example embodiments, operation 880 involves identifying counting the number of profiles with the same information in the same field, and forming a list. The list may ordered according to the count of profiles or by a value of the field. Following operation 880, the histogram is displayed on a display screen of electronic device 110 at operation 890. Operations 810 to 880 may be performed by the network graph parser 234 without the user having requested a histogram, according to some example embodiments. In this case, however, the histogram may be displayed at operation 890 only in response to the option having been selected by the user. In FIG. 9, an example of such a histogram 990 is shown. In this example, the items in the profile description information shared by more than one entities in the graphs were A university, B high school, C high school, living in D city, living in E city, working at F company, working at G company and self-employment.

Returning to FIG. 9, at operation 893, the interface engine 210 receives a user input selecting one of the items. In some embodiments, the user input may be in the form of the user clicking on the row of the histogram 990. In some embodiments, the user input may be in the form of moving cursors to indicate the desired entry in the histogram. In the example shown in FIG. 9, the user input has been received for 'Lives in E city,' which is shared by five entities corresponding to nodes displayed in the graph. At operation 896, in response to this user input, five nodes corresponding to the five entities sharing the profile description information 'Lives in E city' are highlighted. The five entities are treated as being participants in the "Lives in E city" group"; that is, the user's have the attribute of living in E city. In FIG. 9, the highlighted entities are represented by the differently colored nodes 904, 905, 906, 907 and 908.

At any time, any one of the nodes in the graph 900 may be selected by the user using the input device 214 and the cursor control 216. Once selected, the profile 995 of the entity corresponding to the nodes may be displayed near the graph 900. In FIG. 9, for example, when the entity corresponding to the node 904, which is highlighted due to the fact that the profile indicates that the entity 'lives in E city,' is selected by the user, the profile view 995 may be generated and displayed near the graph 900. The information included in the profile view 995 is present in the volatile memory allocated to the browser 1632 because the profile information was retrieved from the repository server 130 during performance of the method 400, the method 600 or the method 800.

Figure 10:
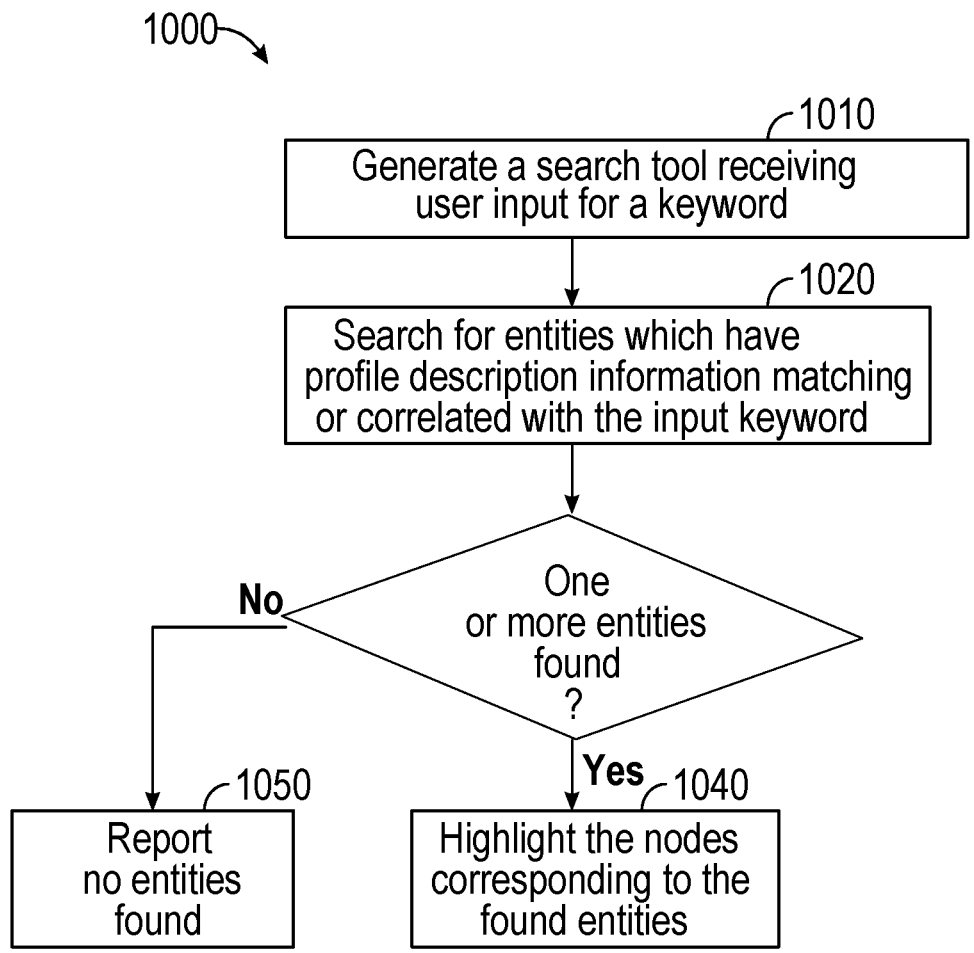
FIG. 10 shows an example flow diagram for receiving filter instructions, according to some example embodiments.
Figure 11:
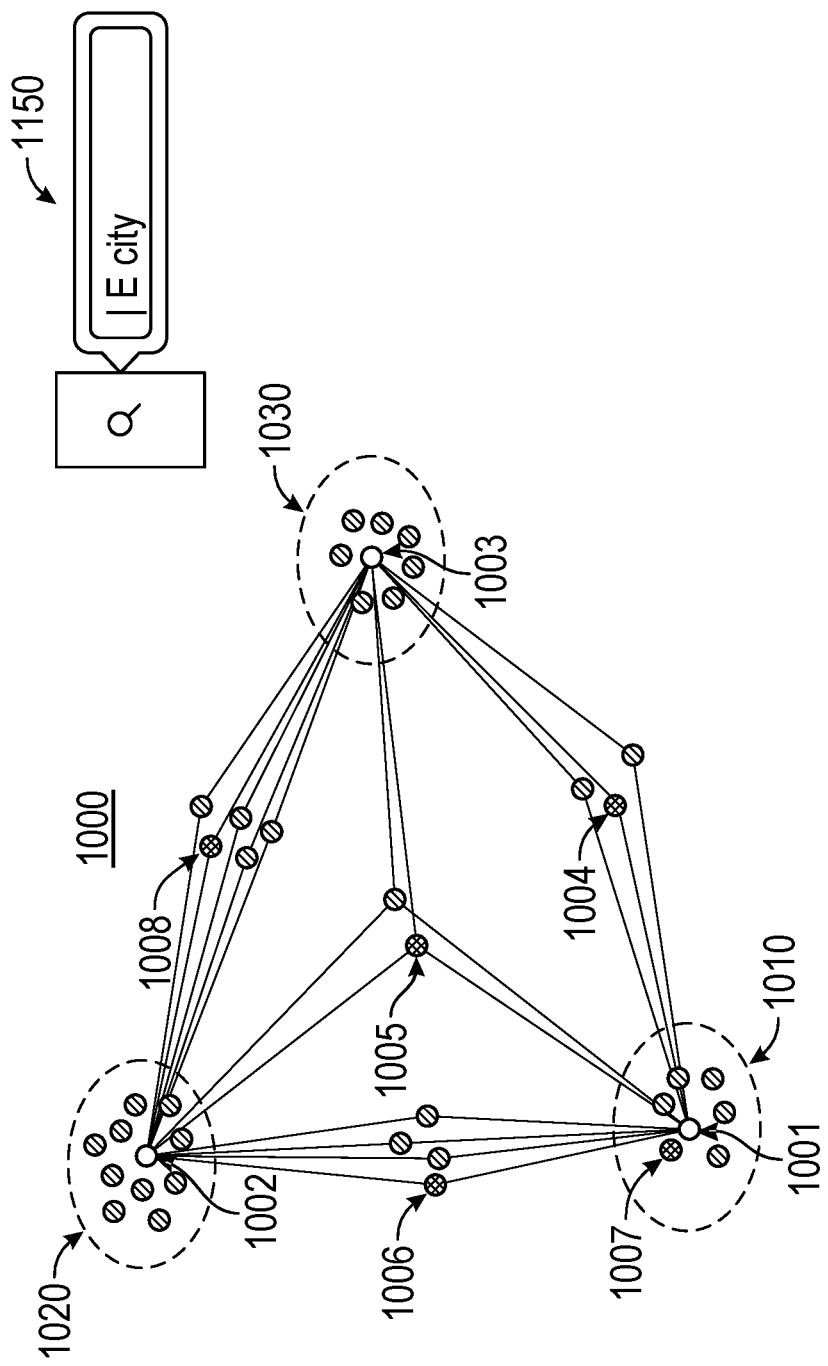
FIG. 11 shows example visualization and user interface elements for filtering node data, according to some example embodiments.

FIG. 10 is a flowchart showing a method 1000 performed by the network graph parser 234 of the electronic device 110 to provide a search facility which can be used to search the profiles of the imported entities, according to some example embodiments. The search facility may be provided in response to a user input selecting a search facility option, for instance through interaction with a user interface element in a sidebar, dock, pull-down menu etc. At operation 1010, the network graph parser 234 may generate a search tool 1150 which can receive a user input for a keyword. In the example of FIG. 11, the keyword 'E city' is input into a text entry box provided by the search tool 1150. The keyword 'E city' corresponds to a group of users that live in the city called 'E city".

FIG. 11 shows an example of a graph 1100 generated by the method 600 and an example of a search tool 1150 generated and operated by the exemplary method 1000. In the left panel of FIG. 11, an example of a graph 1100 generated by the method 600 is shown. In this example, the graph 1100 is similar to the graph 900 in FIG. 9. The graph 1100 is generated from the imported lists of three accessed entities 1101, 1102 and 1103. The search tool 1150 may provide any form of user interface element that can receive the input of the user from the input device 214. For instance, the search tool 1150 may provide a text box into which a user can type alphanumeric characters such as a word or words.

At operation 1020, the node data engine 230 may search in the profiles of the imported entities in the generated graph 1100 which have an entry that matches with the keyword input in the search tool 1150. This is performed by searching the information in the profiles as stored in the working volatile memory allocated to the browser 1632. At operation 1030, if one or more profiles are found to have the same text as the input text, the method proceeds to operation 1040. Here, the corresponding nodes in the graph 1100 are highlighted via the visualization engine 240. If not, the result of search is reported at operation 1050. In the example of FIG. 11, five entities 1104, 1105, 1106, 1107 and 1108, are highlighted as a result of the search for the keyword 'E City.'

Figure 12:
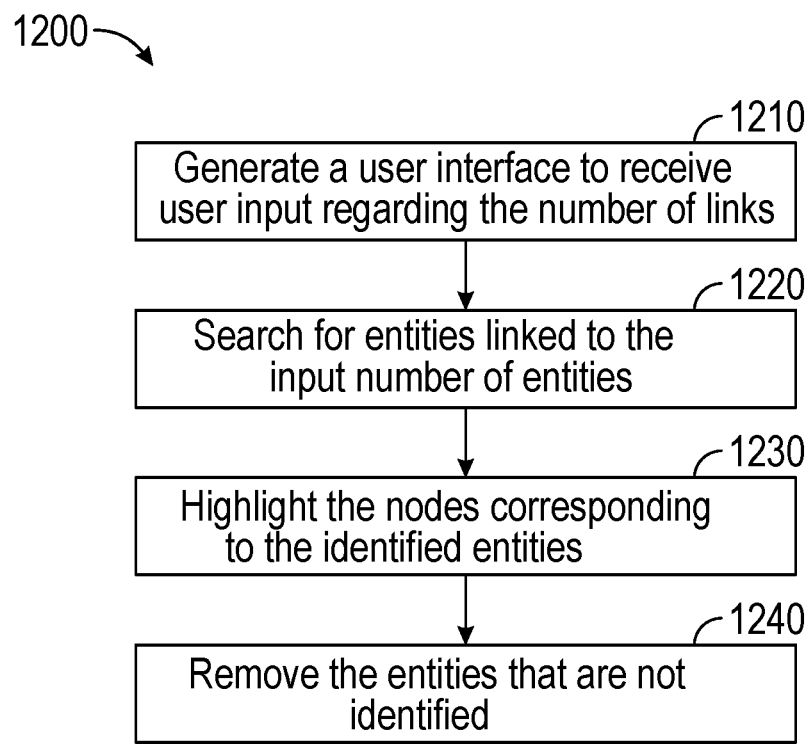
FIG. 12 shows a flow diagram for filtering node data, according to some example embodiments.

FIG. 12 is a flowchart showing a method 1200 performed by the network graph parser 234 of the electronic device 110 to filter the data associated with the entities in a plotted graph to produce a reduced graph, according to some example embodiments. FIG. 13 shows examples of graphs 1300 generated by the method 600 and examples of reduced graphs 1310 (e.g., a refined visual representation) and 1320 generated by the exemplary method 1200.

The filter instruction may be provided in response to a user input selecting a filter option, for instance through interaction with a user interface element in a sidebar, dock, pull-down menu etc. If the number of entities displayed in the graph 1300 is large, the graph may be of limited use to an analyst. The filtering method 1200 allows the isolation of the most significant entities and the removal of less significant entities. Such operation of filtering or reducing data may lead to more efficient, focused and targeted approach in repository website user analysis. This applies to analysis using the network graph parser 234 and to subsequent analysis after export to the database system 10. Furthermore, trimming the graph before exporting data to the database system 10 may prevent the personal profile data of only marginally relevant or irrelevant individuals unnecessarily entering into the database system 10 for analysis. It may also provide regulation compliance advantages since information relating to fewer entities is imported into the database system 10.

At operation 1210, the interface engine 210 generates a user interface element 1350 configured to receive a user input specifying a connection parameter, such as a minimum number of links that is of interest to the user (e.g., a level of connectedness). Limiting the minimum number of links may assist in selecting the entities with the most meaningful connections in the network represented in the graph 1300. The user interface element 1350 may receive the user input via the input device 1614 or the cursor control 1616.

At operation 1220, the node data engine 230 identifies the entities linked to other entities by the number of connections specified by the user input at operation 1210. All of the connections in FIG. 13 correspond to links to one of the selected entities 1301, 1302 and 1303. Therefore, the number of links of an entity in the example of FIG. 13 only corresponds to the number of connections to the user-selected entities 1301, 1302 and 1303.

Figure 13A:
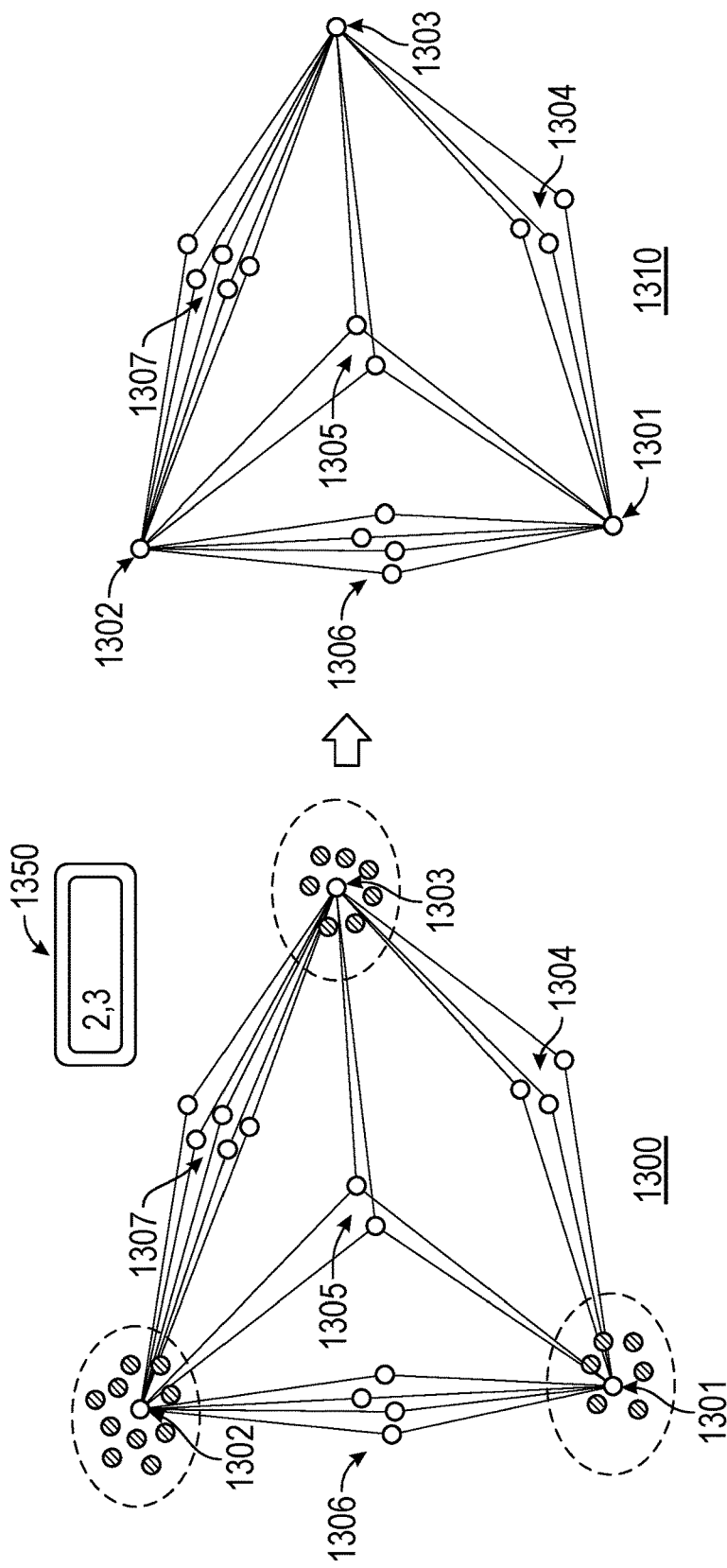
FIGS. 13A and 13B show example visualization and user interface elements for filtering node data, according to some example embodiments.
Figure 13B:
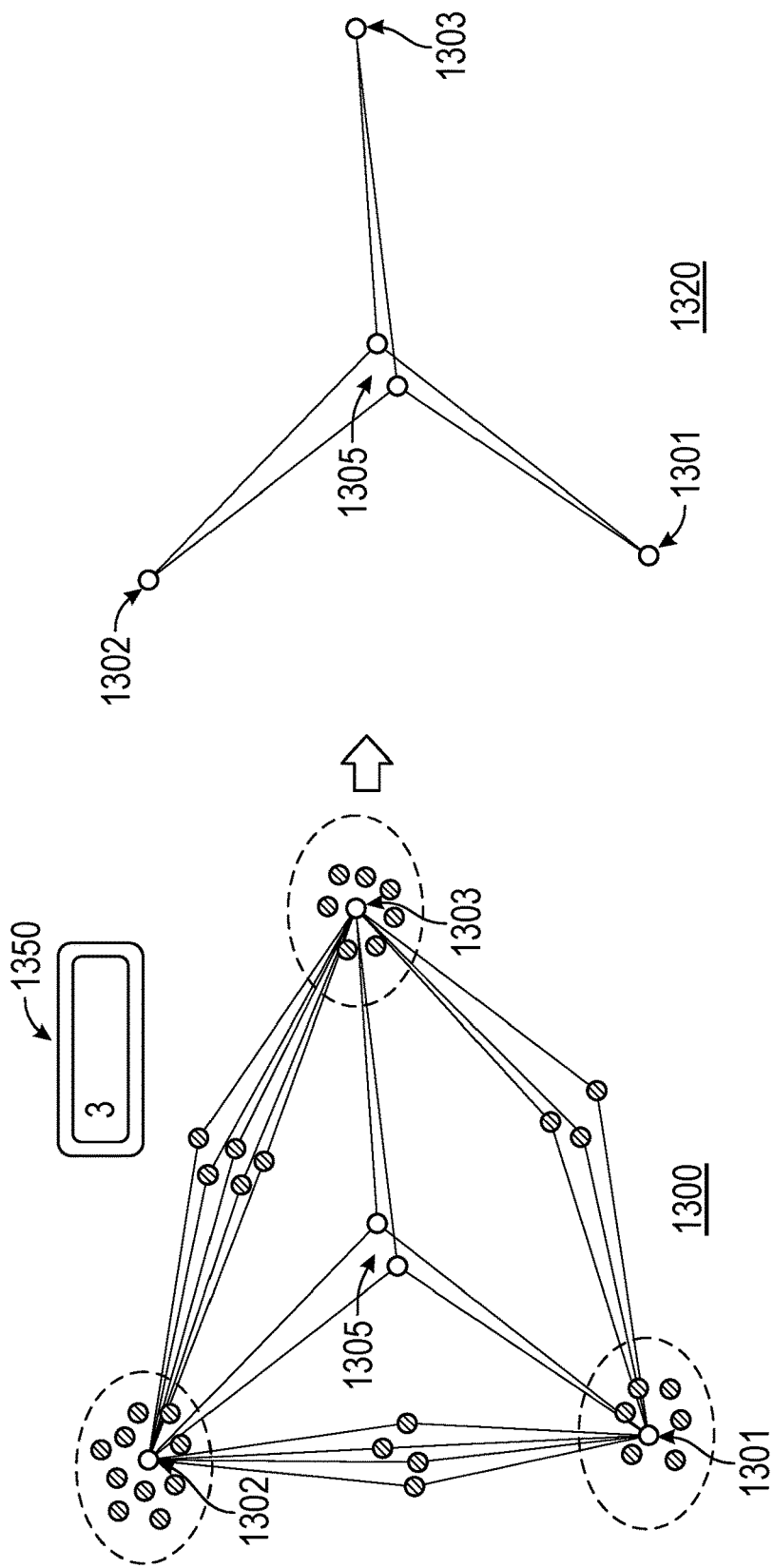

In the example of FIG. 13A, the maximum number of links between entities is three. Therefore, the user input may be "2" or both "2" and "3". The user input of both "2" and "3", as shown in FIG. 13A, may instruct the node data engine 230 to identify the entities with two and three links to selected entities. The user input of "3", as shown in FIG. 13B, may cause the network graph parser 234 to identify only the entities with links to three selected entities. Returning to FIG. 12, at operation 1230, the node data engine 230 searches the nodes (e.g., underlying node data in JSON format) corresponding to the identified entities. In FIG. 13A, as a result of search in this operation, the nodes corresponding to entities having two and three links with the user-selected entities 1301, 1302 and 1303, corresponding to groups of nodes 1304, 1305, 1306 and 1307, have been highlighted by displaying them as empty circles.

In FIG. 13B, the entities having two links with the user-selected entities 1301, 1302 and 1303, corresponding to group of node 1305, have been highlighted as empty circles. Returning to FIG. 12, at operation 1240, the entities that are not identified at operation 1230 and that are not the user-selected entities 1301, 1302 and 1303 may be removed from the graph 1300, according to some example embodiments. This may be achieved by the network graph parser 234 receiving a user input to 'inverse select' the other entities that are not highlighted At operation 1230, and then receiving an input to delete the selected nodes/entities, the delete input being received via the input device 1614 or the cursor control 1616. Alternatively, the network graph parser 234 may receive a user input (e.g., a filter instruction) to remove all the entities except the highlighted entities at operation 1230 and the user-selected entities 1301, 1302 and 1303.

FIG. 13A shows an example of a graph 1310 reduced from the graph 1300 according to the method 1200. In the user interface element 1350, "2" and "3" links have been specified by the user and the graph 1310 shows only the user-selected entities 1301, 1302 and 1303 and the entities that are linked to two or three of the accessed entities, groups of nodes 1304, 1305, 1306 and 1307. In FIG. 13B, the graph 1320 shows an example of a graph trimmed from the graph 1300 according to the exemplary method 1200. In the user interface element 1350, "3" links have been specified and the graph 1320 shows only the user-selected entities 1301, 1302 and 1303 and the entities that are linked to all three of the user-selected entities, namely the group of nodes 1305.

In case the profile description information have been imported along with the entities in the graph 1300, they may be removed along with the entity at operation 1240. After operation 1240, the reduced graphs 1310 or 1320 and/or associated profile description information may be exported to the database system 10 via export engine 250. Though visual graphs are depicted in FIGS. 13A and 13B, it is appreciated that the operations may first be performed on the underlying data used to generate the graphs. That is, the graph 1300 may be generated from initial node data collected from a connections page. A connection parameter may be received from the user that specifies the number of connections required to remain in the node data. Nodes not meeting the attribute specified by the connection parameter are removed. The resulting refined node dataset is then used to generate graph 1310.

Figure 14:
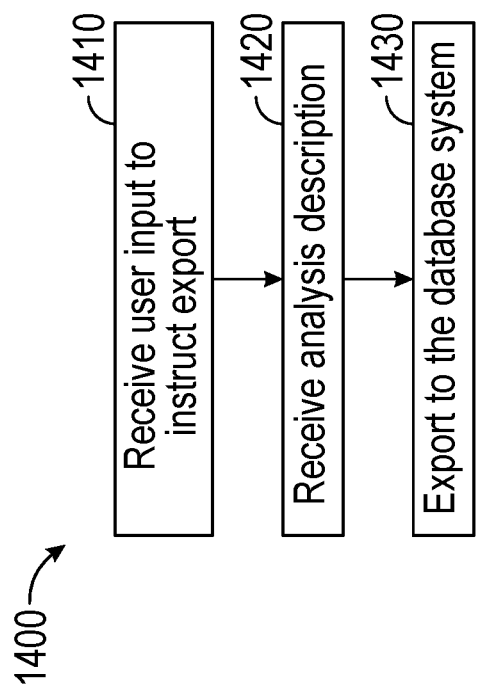
FIG. 14 shows an example flow diagram for analysis and export of node data, according to some example embodiments.

FIG. 14 is a flowchart representing an exemplary method 1400 performed by an electronic device 110 to export the data associated with the entities in the reduced graphs 1310 and 1320. This may correspond to operation 350 discussed above in relation to FIG. 3. At operation 1410, the network graph parser 234 may receive a user input which instructs the network graph parser 234 to export the reduced graphs 1310 or 1320 and associated data such as profile description information of the entities corresponding to the nodes displayed in the graphs 1310 or 1320.

At operation 1420, the interface engine 210 receives a user input specifying an analysis description. The analysis description may be free text. It may relate to the origin, the history and the description of the data and the details regarding the repository website analysis performed. The analysis description may assist in generating trails such that it can be monitored that the performed analysis complies with any rules or regulations that may be relevant in the specific field of analysis. The analysis description also may be useful in case multiple sets of reduced and processed graphs are generated from different starting accessed entities, for example. If a specific entities appear in multiple sets of graphs, the analysis description of each graph may provide additional information therefore provide compounding value of multiple investigations.

At operation 1430, the network graph parser 234 may export the data to the database system 10 via export engine 250. Operation 1430 may involve exporting data relating to entities corresponding to nodes displayed in the graph to the database system 10 without exporting data relating to entities corresponding to nodes not displayed in the graph. In the database system 10, the reduced graph and the associated data may be transformed according to the specific ontology of the deployment for further analysis.

Various modification and alternatives will be apparent to the person skilled in the art and all such modifications and alternatives are intended to be encompassed with the claims Some such modifications and alternatives will now be described.

Although in the above, the profiles for the user-selected entities are sourced from the same electronic repository website service provider, the scope is not limited to this. In other embodiments, profiles for an entity may be retrieved from two or more different repository servers 130-1 to 130-n. In this case, the entity would ordinarily have different identities or usernames on the different electronic repository websites. However, the profiles can be determined by the network graph parser 234 to be related to the same entity by information included in either profile or in both profiles, or may be entered into the network graph parser 234 by the user of the network graph parser 234. Alternatively or in addition, two or more different entities from different electronic repository servers 130 may be selected by the user of the network graph parser 234 as seed entities. In this case, information in profiles for linked to entities may be used to connect profiles in one or more of the repository servers (e.g., repository server 130-1) to corresponding profiles for the same entities in another repository server (e.g., repository server 130-2).

In the above, when an entity is selected for analysis, all of the entities linked to by that profile are retrieved from the electronic repository server 130 and displayed in a graph. Alternatively, a user may specify a limit on the number of entities that are to be retrieved from the electronic repository server 130 by the network graph parser 234 and displayed in a graph. This may be globally set as a setting by the plugin, or it may be selected or entered by the user at the time of selecting the entity. In the above, the histogram is formed from same information in same fields or profiles. Alternatively or in addition, information such as geotag information from photos, comments, mentions, replies, and/or such like.

Figure 15A:
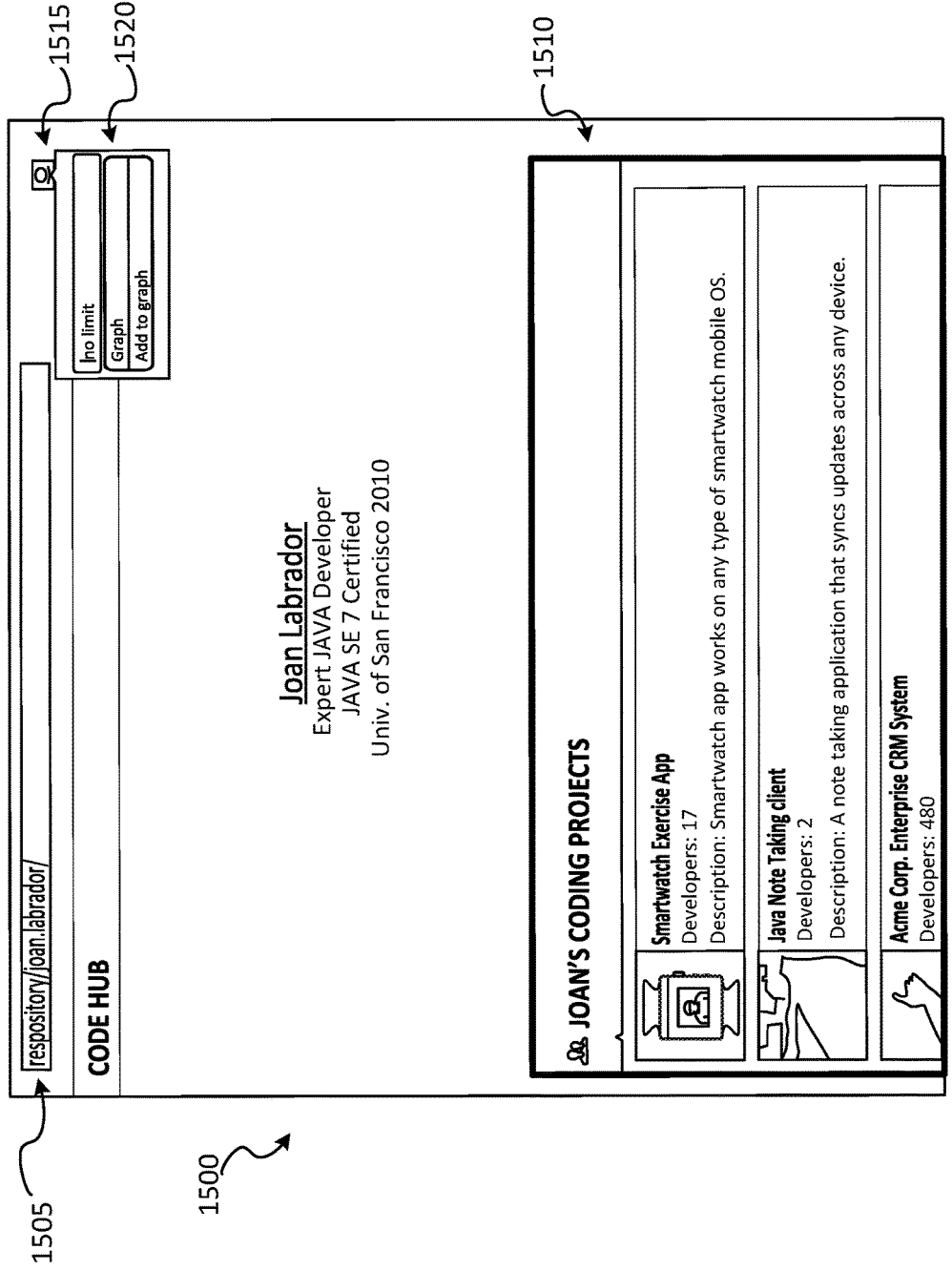
FIGS. 15A and 15B show example user interfaces for processing network graphs using a network graph parser, according to some example embodiments.

FIG. 15A shows an example browser 1500 for parsing node data using the network graph parser 234, according to some example embodiments. In the example of FIG. 15A, an analyst user navigates to the user profile of a user on a code repository website. For example, the analyst user navigates to the URL 1505 ("repository/joan.labrador/"), which is a projects webpage of the software developer "Joan Labrador". In some example embodiments, the analyst user is a user attempting to identify patterns between software projects and the software developer is a user that uploads the source code to a project webpage of a given software project.

The projects webpage displays the user's uploaded software or project data 1510 as display elements (e.g., boxes, static text, hyperlinks). The title for each of the projects may contain a hyperlink that links to the project page for the corresponding project. For example, in the first listed project, "Smartwatch Exercise App" may be a hyperlink that links to a project page for that project. The project page for "Smartwatch Exercise App" may display source code uploaded by the software developer "Joan Labrador". The project page may further contain links to the user profile pages of the seventeen developers that work on that project.

The projects webpage is received as HTTP data from the repository server 130. The webpage is generated from underlying source code in a format, such as HTML. To initiate parsing, the analyst user selects a plugin button 1515 which, as displayed, is integrated into the browser 1500. Responsive to the selection, the interface engine 210 displays a popup window 1520 having different parse options. According to some example embodiments, the first option "Graph" parses all users associated with the user "Joan Labrador" and creates a visualization from the data as discussed above. The second option "Add to graph" adds Joan Labrador as a second entity. For example, the analyst user may have selected a first user to parse (e.g., collect node data of related developers), and then want to select Joan Labrador as a further entity to parse (e.g., collect node data of developers related to Joan Labrador to add to the graph).

Assuming, to continue the example, the data analyst selects the first option "Graph", the network graph parser 234 parses the source code that generates the projects webpage to extract node data from Joan's projects as discussed above. For example, the parse engine 220 can identify each of Joan's projects, including (1) "Smartwatch Exercise App", (2) Java Note Taking client", and (3) "Acme Corp. Enterprise CRM System". The parse engine can navigate to the project page for each of the projects to identify users associated with Joan. For example, the parse engine 220 can user the hyperlink "Smartwatch Exercise App" to navigate to the project page for that project. Further, the parse engine can then identify user profile links on the project page (e.g., the 17 developers working on the "Smartwatch Exercise App" project) and navigate to the user pages to collect node data such as user name, profile page URL, for each of the associated users. The parse engine may perform similar operations to collect node data for the users associated with the other two code projects. The resulting data can then be used to generate visualizations, as shown in FIG. 15B.

Figure 15B:
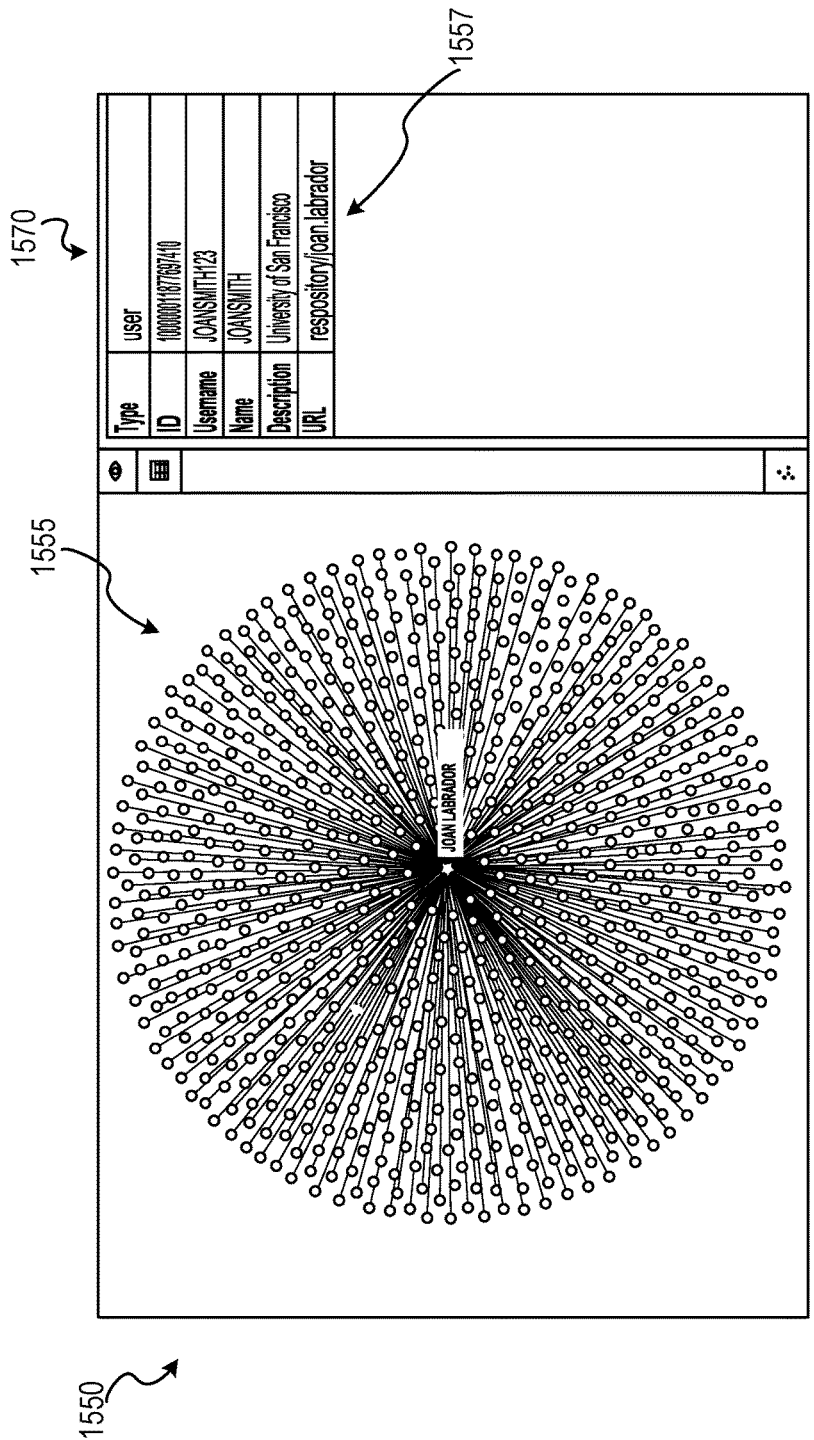

In FIG. 15B, displays a user interface 1550 showing a visualization 1555 generated from the node data of users associated with Joan Labrador through one or more coding or software projects. Each circle or node corresponds to a user associated with Joan through a project. The user interface 1550 may open in a second tab of the browser 1550. As illustrated, the user interface 1550 includes a main area in which the visualization is displayed, and a right bar area 1570. For example, selecting one of the buttons may display the user interface element 1350 (FIG. 13B) which the analyst user can use to specify a connection parameter. Father, as illustrated in the example of FIG. 15B, the right bar area 1570 can be used to show parsed node data 1557 of the selected entity "Joan Labrador." The parsed node data 1557 may be parsed or extracted from the underlying source code of the webpage displayed in FIG. 15A (e.g. a user profile page). According to some example embodiments, if a user select a node from the visualization 1555, the corresponding node data for the node is shown in the right bar area 1570.

Further, according to some example embodiments, the right bar area may be used to show other types of visualizations, such as the histogram 990, instead of the node data. The analyst can then user the histogram to select groups to modify the visualization 1555. In some example embodiments, the network graph parser spiders to one or more hyperlink for each users listed in a project page and to collect parsed node data similar to Joan's parsed node data 1557.

Figure 16:
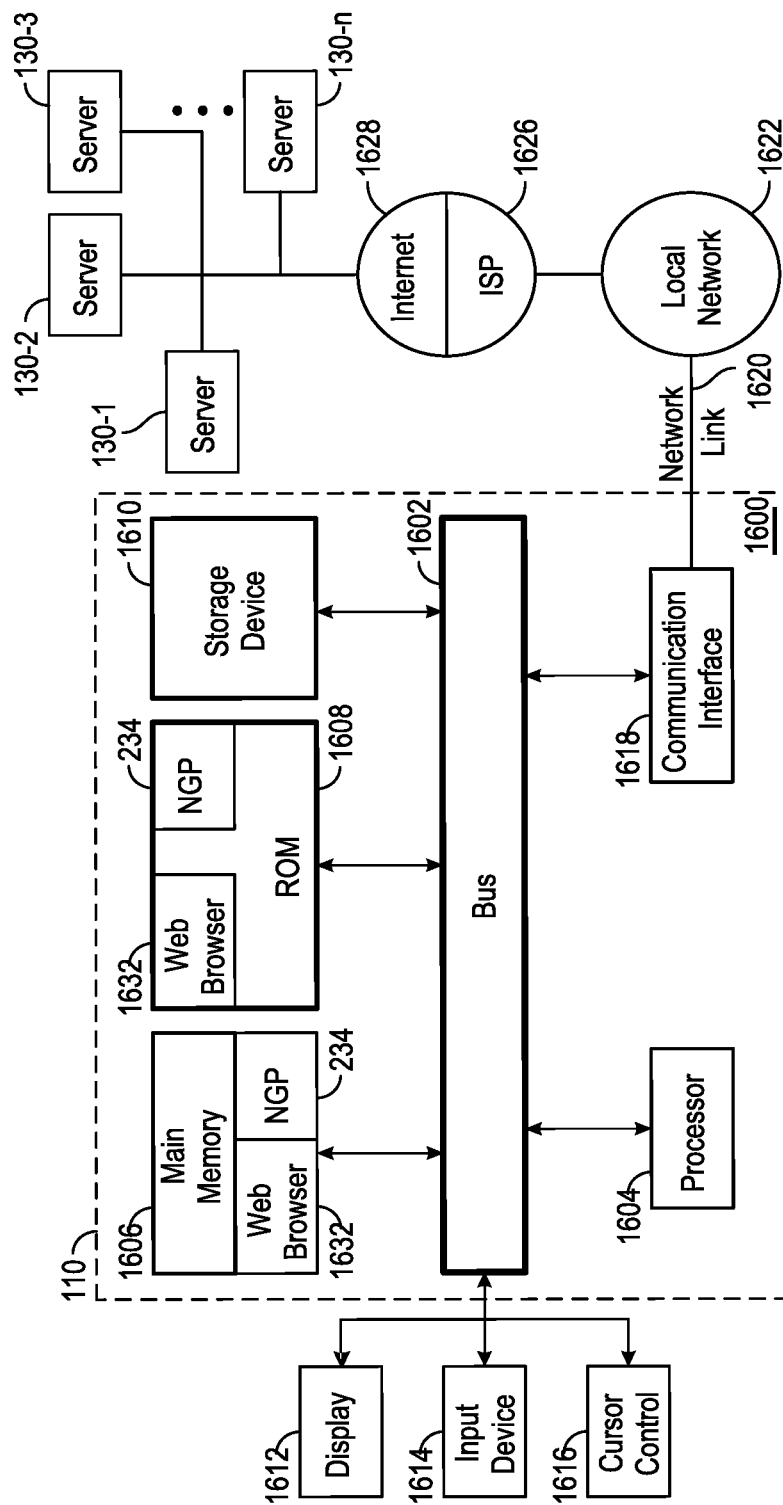
FIG. 16 illustrates a diagrammatic representation of a machine in the form of a computer system within which a set of instructions may be executed for causing the machine to perform any one or more of the methodologies discussed herein, according to an example embodiment.

FIG. 16 is a block diagram that illustrates a computer system 1600, which may constitute the electronic device 110, according to some example embodiments. As illustrated, computer system 1600 includes a bus 1602 or other communication mechanism for communicating information, and one or more hardware processors 1604 (including processor circuitry), coupled with bus 1602 for processing information. One or more hardware processors 1604 can be, for example, one or more general purpose microprocessors, each including processor circuitry. Computer system 1600 also includes a main memory 1606, such as a random access memory (RAM) or other dynamic storage device, coupled to bus 1602 for storing information and instructions to be executed by processor 1604.

Main memory 1606 also can be used for storing temporary variables or other intermediate information during execution of instructions to be executed by processor 1604. Such instructions, when stored in non-transitory storage media accessible to one or more processors 1604, render computer system 1600 into a special-purpose machine that is customized to perform the operations specified in the instructions. Main memory 1606 may also be used for temporarily storing the whole of part of applications, such as the web browser 1632, including the network graph parser 234, while they are being executed by the electronic device 110. As illustrated in FIG. 2, the network graph parser 234 may be integrated or installed into the web browser 1632. For example, the network graph parser 234 may be installed as a plugin or extension of the web browser 1632.

The main memory 1606 is a volatile memory in that data stored therein is lost when power is no longer provided to the memory 1606. The main memory 1606 is used to temporarily store information that is being processed by software applications, including the web browser 1632 and the network graph parser 234. In relation to the web browser 1632 and the network graph parser 234, information that is temporarily stored includes webpages and ancillary content that is received from the repository servers 130-1 to 130-n. In relation to the web browser 1632 and the network graph parser 234, information that is temporarily stored also includes information parsed from webpages by the network graph parser 234 and information derived from such received information by the plugin, as is described in detail below.

Computer system 1600 further includes a read only memory (ROM) 1608 or other static storage device coupled to bus 1602 for storing static information and instructions for processor 1604. The ROM 1608 is used for permanent storage of applications such as the web browser 1632, including the network graph parser 234, when the electronic device is not powered on and/or when the applications are not being executed by the processor 1604. The storage is of the computer code or instructions that constitute the applications. A storage device 1610, such as a magnetic disk, optical disk, or USB thumb drive (Flash drive), etc., is provided and coupled to bus 1602 for storing information and instructions.

Computer system 1600 can be coupled via bus 1602 to a display 1612, such as an LCD or plasma display, or a touchscreen or cathode ray tube (CRT), for displaying information to a computer user. An input device 1614, for instance a keyboard, including alphanumeric and other keys, is coupled to bus 1602 for communicating information and command selections to processor 1604. Another type of user input device is cursor control 1616, such as a mouse, a trackball, or cursor direction keys for communicating direction information and command selections to processor 1604 and for controlling cursor movement on display 1612. In some embodiments, the same direction information and command selections as cursor control may be implemented via receiving touches on a touch screen without a cursor. It will be appreciated that the processor 1604, under control of software and/or operating system, causes display of graphics and text, and that the display 1612 displays such. Displaying a graph comprises displaying a graphical representation.

The term "non-transitory media" as used herein refers to any media storing data and/or instructions that cause a machine to operate in a specific fashion. Such non-transitory media can comprise non-volatile media and/or volatile media. Non-volatile media includes, for example, optical or magnetic disks, such as storage device 1610. Volatile media includes dynamic memory, such as main memory 1606. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from, but can be used in conjunction with, transmission media. Transmission media participates in transferring information between storage media. For example, transmission media includes coaxial cables, copper wire and fiber optics, including the wires that comprise bus 1602. Transmission media can also take the form of acoustic or light waves, such as those generated during radio-wave and infra-red data communications. Various forms of media can be involved in carrying one or more sequences of one or more instructions to processor 1604 for execution. For example, the instructions can initially be carried on a magnetic disk or solid state drive of a remote computer. The remote computer can load the instructions into its dynamic memory and send the instructions over a telephone line using a modem. A modem local to computer system 1600 can receive the data on the telephone line and use an infra-red transmitter to convert the data to an infra-red signal. An infra-red detector can receive the data carried in the infra-red signal and appropriate circuitry can place the data on bus 1602. Bus 1602 carries the data to main memory 206, from which processor 1604 retrieves and executes the instructions. The instructions received by main memory 1606 can optionally be stored on storage device 1610 either before or after execution by processor 1604.

Computer system 1600 also includes a communication interface 1618 coupled to bus 1602. Communication interface 1618 provides a two-way data communication coupling to a network link 1621 that is connected to a local network 1622. For example, communication interface 1618 can be an integrated services digital network (ISDN) card, cable modem, satellite modem, or a modem to provide a data communication connection to a corresponding type of telephone line. As another example, communication interface 1618 can be a local area network (LAN) card to provide a data communication connection to a compatible LAN. Wireless links can also be implemented. In any such implementation, communication interface 1618 sends and receives electrical, electromagnetic or optical signals that carry digital data streams representing various types of information.

Network link 1621 typically provides data communication through one or more networks to other data devices. For example, network link 1621 can provide a connection through local network 1622 to data equipment operated by an Internet Service Provider (ISP) 1626. ISP 1626 in turn provides data communication services through the world wide packet data communication network now commonly referred to as the "Internet" 1628. Local network 1622 and Internet 1628 both use electrical, electromagnetic or optical signals that carry digital data streams. The signals through the various networks and the signals on network link 1621 and through communication interface 1618, which carry the digital data to and from computer system 1600, are example forms of transmission media.

Computer system 1600 can send messages and receive data, including program code, through the network(s), network link 1621 and communication interface 1618. In the Internet example, a server 1627 might transmit a requested code for an application program through Internet 1628, ISP 1626, local network 1622 and communication interface 1618. The received code can be executed by processor 1604 as it is received, and/or stored in storage device 1610, or other non-volatile storage for later execution.

The network graph parser 234 is integrated into the web browser 1632 to form part of the web browser 1632. The user can first download the network graph parser 234 from an appropriate web site or other source (e.g. portable storage such as a thumb drive or a storage device on a local network) and then can proceed to install the network graph parser 234. Since a typical network graph parser 234 is designed to be compatible to a specific web browser 1632 (e.g., Google™ Chrome™, Mozilla™ Firefox™, Microsoft™ Internet Explorer™, etc.), the network graph parser 234 can become a part of the web browser 1632 automatically after the network graph parser 234 is installed.

Above, various actions are described as being performed by the network graph parser 234 and/or the web browser 1632. It will be appreciated that this is shorthand for computer program instructions that form part of the network graph parser 234 or the browser 1632, as the case may be, being executed by the processor 1604 and causing the processor 1604 to take the action. In doing so, some or all of the computer code/instructions constituting the network graph parser 1634 and the browser 1632 are copied from the ROM 1608 and stored in the main memory 206, which is a volatile memory, such that the computer code/instructions constituting the network graph parser 234 and the browser 1632 can be executed by the processor 1604. In executing the computer code/instructions constituting the network graph parser 234 and the browser 1632, the processor 204 is controlled to store data (other than the computer code/instructions constituting the network graph parser 234 and the browser 1632) temporarily in the main memory 1606. As mentioned above, the main memory 1606 is volatile memory and as such data stored therein is lost when the main memory 1606 is de-powered.

Certain embodiments are described herein as including logic or a number of components, modules, or engines. Engines can constitute either software engines (e.g., code embodied on a machine-readable medium) or hardware engines. A "hardware module" is a tangible unit capable of performing certain operations and can be configured or arranged in a certain physical manner. In various example embodiments, one or more computer systems (e.g., a standalone computer system, a client computer system, or a server computer system) or one or more hardware engines of a computer system (e.g., a processor or a group of processors) can be configured by software (e.g., an application or application portion) as a hardware module that operates to perform certain operations as described herein.

In some embodiments, a hardware engines can be implemented mechanically, electronically, or any suitable combination thereof. For example, a hardware engines can include dedicated circuitry or logic that is permanently configured to perform certain operations. For example, a hardware engines can be a special-purpose processor, such as a Field-Programmable Gate Array (FPGA) or an Application Specific Integrated Circuit (ASIC). A hardware engines may also include programmable logic or circuitry that is temporarily configured by software to perform certain operations. For example, a hardware engines can include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware engines mechanically, in dedicated and permanently configured circuitry, or in temporarily configured circuitry (e.g., configured by software) can be driven by cost and time considerations.

Accordingly, the phrase "hardware engine" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented engine" refers to a hardware module. Considering embodiments in which hardware engines are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software accordingly configures a particular processor or processors, for example, to constitute a particular hardware module at one instance of time and to constitute a different hardware module at a different instance of time.

Hardware modules can provide information to, and receive information from, other hardware modules. Accordingly, the described hardware modules can be regarded as being communicatively coupled. Where multiple hardware modules exist contemporaneously, communications can be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module can perform an operation and store the output of that operation in a memory device to which it is communicatively coupled. A further hardware module can then, at a later time, access the memory device to retrieve and process the stored output. Hardware modules can also initiate communications with input or output devices, and can operate on a resource (e.g., a collection of information).

The various operations of example methods described herein can be performed, at least partially, by one or more processors that are temporarily configured (e.g., by software) or permanently configured to perform the relevant operations. Whether temporarily or permanently configured, such processors constitute processor-implemented modules that operate to perform one or more operations or functions described herein. As used herein, "processor-implemented module" refers to a hardware module implemented using one or more processors.

Similarly, the methods described herein can be at least partially processor-implemented, with a particular processor or processors being an example of hardware. For example, at least some of the operations of a method can be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented modules can be located in a single geographic location (e.g., within a home environment, an office environment, or a server farm). In other example embodiments, the processors or processor-implemented modules are distributed across a number of geographic locations.

The modules, methods, applications and so forth described in conjunction with FIGS. 1-15 are implemented in some embodiments in the context of a machine and an associated software architecture. The sections below describe representative software architecture and machine (e.g., hardware) architecture that are suitable for use with the disclosed embodiments.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A method comprising:
   storing, via a browser using a processor, node connection data of an initial user object associated with a website, the node connection data being included in a page of the website;
   identifying additional user objects included in the node connection data of the initial user object;
   storing, in the browser, additional node connection data of the additional user objects;
   displaying, within the browser, a visual representation depicting connections of the initial user object and the additional user objects, the visual representation generated using the node connection data and the additional node connection data;
   receiving a selection instruction specifying a portion of the additional user objects to select in the visual representation based on a connection parameter, the connection parameter specifying an attribute of the initial user object and the additional user objects;
   receiving an inversion instruction to remove non-selected portions that are not in the specified portion of the selected additional user objects;
   displaying, within the browser, a reduced visual representation that depicts connections between the initial user object and the portion of the additional user objects; and
   exporting, from the browser, a reduced node dataset that includes the node connection data of the initial user object and the additional node connection data of the portion of the additional user objects.

2. The method of claim 1, wherein the attribute is a quantity of connections to other user objects, and the connection parameter specifies that for inclusion in the portion each object has more than a specified quantity of connections to other user objects.

3. The method of claim 1, wherein the attribute is participation in an object group on the website, and the connection parameter specifies that for inclusion in the portion each object is a participant in a selected group on the website.

4. The method of claim 1, wherein the visual representation and the reduced visual representation are network graphs having nodes connected by edges, the nodes corresponding to the initial user object and the additional user objects, the edges corresponding to connections among the initial user object and the additional user objects.

5. The method of claim 1, further comprising:
   receiving one or more search terms to search in the additional user objects;
   identifying one or more additional user objects that match the one or more search terms; and
   storing the one or more additional user objects as the portion specified by the selection instruction.

6. The method of claim 1, wherein the browser is an Internet browser application, and wherein the reduced node dataset is stored in plugin memory of the browser.

7. The method of claim 6, further comprising:
   transmitting, over a network, the reduced node dataset to a server.

8. The method of claim 1, wherein the additional node connection data is extracted in a process comprising:
   identifying a current webpage that is currently displayed on the browser as an object page from which to extract data, the object page being provided by the website in a first code format configured for display of objects in browsers;
   extracting the additional node connection data from the first code format of the object page; and
   transforming the additional node connection data into a second code format different from the first code format.

9. The method of claim 8, wherein the first code format is a markup language and the second code format is an attribute-value language, and wherein the visual representation is generated from using the additional node connection data in the second code format.

10. The method of claim 1, wherein the node connection data is user data and the initial user object is a user of the website, and wherein the additional node connection data is additional user data and the additional user objects are other users that are connected to the user on the website.

11. The method of claim 1, wherein each of the node connection data and the additional node connection data comprise at least one of the following:
   a portion of executable software code, a username of a given user on the website, a uniform resource locator (URL) of a profile page of the given user on the website, images uploaded by the given user to the website, text uploaded by the given user to the website.

12. A system comprising:
one or more processors of a machine; and
a memory comprising instructions that, when executed by the one or more processors, cause the machine to perform operations comprising:
storing, via a browser using a processor, node connection data of an initial user object associated with a website, the node connection data being included in a page of the website;
identifying additional user objects included in the node connection data of the initial user object;
storing, in the browser, additional node connection data of the additional user objects;
displaying, within the browser, a visual representation depicting connections of the initial user object and the additional user objects, the visual representation generated using the node connection data and the additional node connection data;
receiving a selection instruction specifying a portion of the additional user objects to select in the visual representation based on a connection parameter, the connection parameter specifying an attribute of the initial user object and the additional user objects;
receiving an inversion instruction to remove non-selected portions that are not in the specified portion of the selected additional user objects;
displaying, within the browser, a reduced visual representation that depicts connections between the initial user object and the portion of the additional user objects; and
exporting, from the browser, a reduced node dataset that includes the node connection data of the initial user object and the additional node connection data of the portion of the additional user objects.

13. The system of claim 12, wherein the attribute is a quantity of connections to other user objects, and the connection parameter specifies that for inclusion in the portion each object has more than a specified quantity of connections to other user objects.

14. The system of claim 12, the operations further comprising:
transmitting, over a network, the reduced node dataset to a server.

15. The system of claim 12, wherein the additional node connection data is extracted in a process comprising:
identifying a current webpage that is currently displayed on the browser as an object page from which to extract data, the object page being provided by the website in a first code format configured for display of objects in browsers;
extracting the additional node connection data from the first code format of the object page; and
transforming the additional node connection data into a second code format different from the first code format.

16. The system of claim 12, wherein the node connection data is user data and the initial user object is a user of the website, and wherein the additional node connection data is additional user data and the additional user objects are other users that are connected to the user on the website.

17. A computer readable storage medium comprising instructions that, when executed by one or more processors of a device, cause the device to perform operations comprising:
storing, via a browser using a processor, node connection data of an initial user object associated with a website, the node connection data being included in a page of the website;
identifying additional user objects included in the node connection data of the initial user object;
storing, in the browser, additional node connection data of the additional user objects;
displaying, within the browser, a visual representation depicting connections of the initial user object and the additional user objects, the visual representation generated using the node connection data and the additional node connection data;
receiving a selection instruction specifying a portion of the additional user objects to select in the visual representation based on a connection parameter, the connection parameter specifying an attribute of the initial user object and the additional user objects;
receiving an inversion instruction to remove non-selected portions that are not in the specified portion of the selected additional user objects;
displaying, within the browser, a reduced visual representation that depicts connections between the initial user object and the portion of the additional user objects; and
exporting, from the browser, a reduced node dataset that includes the node connection data of the initial user object and the additional node connection data of the portion of the additional user objects.

18. The computer readable storage medium of claim 17, wherein the attribute is a quantity of connections to other user objects, and the connection parameter specifies that for inclusion in the portion each object has more than a specified quantity of connections to other user objects.

19. The computer readable storage medium of claim 17, wherein the additional node connection data is extracted in a process comprising:
identifying a current webpage that is currently displayed on the browser as an object page from which to extract data, the object page being provided by the website in a first code format configured for display of objects in browsers;
extracting the additional node connection data from the first code format of the object page; and
transforming the additional node connection data into a second code format different from the first code format.

20. The computer readable storage medium of claim 17, wherein the node connection data is user data and the initial user object is a user of the website, and wherein the additional node connection data is additional user data and the additional user objects are other users that are connected to the user on the website.

* * * * *